United States Patent
Fujimaki

(10) Patent No.: US 10,643,390 B2
(45) Date of Patent: May 5, 2020

(54) HEAD MOUNTED DISPLAY, METHOD FOR CONTROLLING HEAD MOUNTED DISPLAY, AND COMPUTER PROGRAM

(71) Applicant: SEIKO EPSON CORPORATION, Tokyo (JP)

(72) Inventor: Yutaka Fujimaki, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 15/466,073

(22) Filed: Mar. 22, 2017

(65) Prior Publication Data
US 2017/0287222 A1 Oct. 5, 2017

(30) Foreign Application Priority Data

Mar. 30, 2016 (JP) ................ 2016-068694
Nov. 22, 2016 (JP) ................ 2016-226406

(51) Int. Cl.
| | |
|---|---|
| *G06T 19/00* | (2011.01) |
| *G06T 19/20* | (2011.01) |
| *G06F 3/01* | (2006.01) |
| *G02B 27/00* | (2006.01) |
| *G02B 27/01* | (2006.01) |

(52) U.S. Cl.
CPC ........ *G06T 19/006* (2013.01); *G02B 27/0093* (2013.01); *G02B 27/017* (2013.01); *G02B 27/0179* (2013.01); *G06F 3/013* (2013.01); *G06F 3/017* (2013.01); *G06T 19/20* (2013.01); *G02B 2027/014* (2013.01); *G02B 2027/0132* (2013.01); *G02B 2027/0178* (2013.01); *G02B 2027/0181* (2013.01)

(58) Field of Classification Search
None
See application file for complete search history.

(56) References Cited

U.S. PATENT DOCUMENTS

| | | | |
|---|---|---|---|
| 2002/0037768 A1 | 3/2002 | Ohshima | |
| 2004/0095311 A1 | 5/2004 | Tarlton et al. | |
| 2010/0156787 A1 | 6/2010 | Katayama | |
| 2010/0199232 A1* | 8/2010 | Mistry | G06F 1/163 715/863 |
| 2011/0234879 A1* | 9/2011 | Kashitani | G06F 3/011 348/333.02 |

(Continued)

FOREIGN PATENT DOCUMENTS

| | | |
|---|---|---|
| JP | 2002-112286 A | 4/2002 |
| JP | 2006-506737 A | 2/2006 |

(Continued)

*Primary Examiner* — Ke Xiao
*Assistant Examiner* — Jed-Justin Imperial
(74) *Attorney, Agent, or Firm* — Oliff PLC

(57) ABSTRACT

A head mounted display includes an image display section, an acquisition section that acquires information on a real space, and a control section that causes the image display section to form a virtual image containing a virtual object that is an object that does not exist in the real space. The control section analyzes the acquired information on the real space to determine a reference plane that is a flat plane that is present in the real space and satisfies a predetermined condition and changes the virtual object visually recognized by the user based on the reference plane.

16 Claims, 23 Drawing Sheets

(56) References Cited

U.S. PATENT DOCUMENTS

| | | | |
|---|---|---|---|
| 2013/0223673 A1* | 8/2013 | Davis | G06K 9/78 |
| | | | 382/100 |
| 2013/0241805 A1* | 9/2013 | Gomez | G09G 3/003 |
| | | | 345/8 |
| 2014/0368540 A1 | 12/2014 | Iguchi | |
| 2015/0109336 A1 | 4/2015 | Hayakawa et al. | |
| 2015/0253862 A1 | 9/2015 | Seo et al. | |
| 2016/0109957 A1* | 4/2016 | Takashima | G06F 1/163 |
| | | | 345/8 |
| 2016/0246384 A1* | 8/2016 | Mullins | G06F 3/017 |

FOREIGN PATENT DOCUMENTS

| | | |
|---|---|---|
| JP | 2010-145860 A | 7/2010 |
| JP | 2015-079447 A | 4/2015 |
| JP | 2015-519673 A | 7/2015 |
| WO | 2013/188054 A1 | 12/2013 |

* cited by examiner

HEAD MOUNTED DISPLAY, METHOD FOR CONTROLLING HEAD MOUNTED DISPLAY, AND COMPUTER PROGRAM

BACKGROUND

1. Technical Field

The present invention relates to a head mounted display.

2. Related Art

There is a known head mounted display that is mounted on a user's head and forms a virtual image in the user's field of view. Further, there is a known technology called augmented reality (AR) in which a computer is used to add and present information to a real environment. JP-A-2015-519673 describes a head mounted display that uses the augmented reality technology to form a virtual image representing a virtual input plane in a user's field of view and allows the user to perform input to the virtual input plane.

On the other hand, in recent years, it has been proposed to use a transmissive head mounted display, which does not block the visual field of the user on whom the head mounted display is mounted, in a variety of scenes, such as a work scene and a life scene. For example, a head mounted display used, for example, in manufacturing industries presents not only the virtual input plane described above but also a virtual guide plane showing a work procedure, a work content, and other pieces of information that the user should follow by using the augmented reality technology. The thus configured head mounted display, however, has a problem of poor usability because the virtual input plane and guide plane are displayed in a position and at an inclination unintended by the user in some cases. In the following description, an imaginarily created object that forms the virtual input plane or the virtual guide plane is also called an "virtual object."

A head mounted display capable of displaying an virtual object in a position and at an inclination intended by a user has therefore been desired.

SUMMARY

An advantage of some aspects of the invention is to solve at least a part of the problems described above, and the invention can be implemented as the following configurations.

(1) According to an aspect of the invention, a head mounted display is provided. The head mounted display includes an image display section that allows a user on whom the head mounted display is mounted to visually recognize a virtual image, an acquisition section that acquires information on a real space, and a control section that causes the image display section to form the virtual image containing a virtual object that is an object that does not exist in the real space, and the control section analyzes the acquired information on the real space to determine a reference plane that is a flat plane that is present in the real space and satisfies a predetermined condition and changes the virtual object visually recognized by the user based on the determined reference plane.

According to the head mounted display of the aspect described above, the control section changes the virtual object visually recognized by the user on the basis of the reference plane present in the real space. The user can therefore adjust the reference plane to adjust the virtual object visually recognized in the form of the virtual image as intended.

(2) In the head mounted display of the aspect described above, the control section may determine a position and an inclination of the reference plane in the user's visual field and change a position and an inclination of the virtual object based on the determined position and inclination of the reference plane.

According to the head mounted display of the aspect described above, the user can adjust the position and inclination of the virtual object visually recognized in the form of the virtual image as intended by adjusting the position and inclination of the reference plane.

(3) In the head mounted display of the aspect described above, the control section may change the position and inclination of the virtual object visually recognized by the user to be equal to the position and inclination of the reference plane.

According to the head mounted display of the aspect described above, the position and inclination of the virtual object visually recognized by the user in the form of the virtual image are equal to the position and the inclination of the reference plane present in the real space. The user can therefore intuitively adjust the position and inclination of the virtual object.

(4) The head mounted display of the aspect described above may further include a sight line detection section that acquires a direction of the user's sight line, and in the determination of the position and inclination of the reference plane, the acquisition section may omit acquisition of information on the real space that does not correspond to the direction of the sight line acquired by the sight line detection section.

According to the head mounted display of the aspect described above, since the acquisition section omits acquisition of information on the real space that does not correspond to the direction of the user's sight line, the amount of information on the real space acquired by the acquisition section can be reduced. As a result, the processing burden in the analysis performed by the control section can be reduced.

(5) In the head mounted display of the aspect described above, the control section may further determine the position and inclination of the reference plane in the user's visual field again when a predetermined first action performed by the user is detected and change the changed position and inclination of the virtual object again based on the newly determined position and inclination of the reference plane.

According to the head mounted display of the aspect described above, the control section changes the position and inclination of the virtual object again in response to the first action, whereby the convenience to the user can be improved.

(6) In the head mounted display of the aspect described above, the control section may further change a display aspect of the virtual object when a predetermined second action performed by the user is detected.

According to the head mounted display of the aspect described above, the control section changes the display aspect of the virtual object in response to the second action, whereby the convenience to the user can be improved.

(7) In the head mounted display of the aspect described above, the second action may contain at least one of movement of the user's hand in the real space and a change in a shape of the hand.

According to the head mounted display of the aspect described above, the user can more intuitively change the display aspect of the virtual object.

(8) In the head mounted display of the aspect described above, the control section may take at least one of a human hand, the user's hand, an object having a predetermined shape, and an image containing information having a predetermined pattern as an object having the reference plane.

According to the head mounted display of the aspect described above, the control section takes at least any of a human hand, the user's own hand, an object having a predetermined shape, and an image containing information having a predetermined pattern as an object having the reference plane for efficient processing.

(9) In the head mounted display of the aspect described above, the flat plane that satisfies the predetermined condition may be a plane having flatness within a predetermined first range and having an area greater than or equal to a predetermined second value as a result of 3D recognition.

According to the head mounted display of the aspect described above, the control section sets a condition that the flat plane has flatness within the first range as a result of 3D recognition. Appropriate setting of the first range allows the control section to take a plane having irregularities to some extent, for example, a human hand, as the reference plane, and exclusion of a plane having large irregularities, for example, a human face, from candidates of the reference plane allows suppression of wrong recognition. Further, the control section sets a condition that the flat plane has an area greater than or equal to the predetermined second value. Appropriate setting of the second value allows the control section to exclude a hand of another person and other object remote from the user from candidates of the reference plane to suppress wrong recognition.

(10) The head mounted display of the aspect described above may transmit an outside scene to allow the user to visually recognize the outside scene in addition to the virtual image.

According to the head mounted display of the aspect described above, the user can visually recognize an outside scene in addition to the virtual image.

(11) The head mounted display of the aspect described above may further include a distance detection section that detects a distance to the reference plane. The image display section may include a right image display section that has a plurality of pixels for a right eye and allows the user's right eye to visually recognize the virtual image and a left image display section that has a plurality of pixels for a left eye and allows the user's left eye to visually recognize the virtual image. The control section may change positions of pixels of the virtual object in the plurality of pixels for the right eye and the plurality of pixels for the left eye in accordance with the distance.

According to the head mounted display of the aspect described above, the positions of the pixels of the virtual object can be changed in accordance with the distance to the reference plane, whereby the position where the virtual object is displayed can be changed in accordance with the distance.

(12) In the head mounted display of the aspect described above, the control section may change the positions of the pixels of the virtual object in such a way that a display convergence angle that is an angle formed by the right eye and the left eye viewed from the virtual object decreases as a reference convergence angle that is an angle formed by the right eye and the left eye viewed from the reference plane decreases.

According to the head mounted display of the aspect described above, a large difference between the reference convergence angle and the display convergence angle can be avoided, whereby the user can visually recognize both the reference plane and the virtual object without feeling uncomfortable.

(13) In the head mounted display of the aspect described above, the control section may change the positions of the pixels of the virtual object in such a way that the reference convergence angle is equal to the display convergence angle.

According to the head mounted display of the aspect described above, the reference convergence angle can be equal to the display convergence angle, whereby the user can visually recognize both the reference plane and the virtual object without feeling uncomfortable.

All the components provided in the aspects of the invention described above are not essential, and to solve part or entirety of the problems described above or to achieve part or entirety of the advantageous effects described in the present specification, part of the components can be changed, omitted, and replaced with new components, and limiting factors of the components are partially omitted as appropriate. Further, to solve part or entirety of the problems described above or to achieve part or entirety of the advantageous effects described in the present specification, part or entirety of the technical features contained in any one of the aspects of the invention described above can be combined with part or entirety of the technical features contained in another one of the aspects of the invention described above into an independent aspect of the invention.

The invention can be implemented in a variety of aspects, for example, as follows: a head mounted display; a method for controlling a head mounted display; an image display system including a head mounted display; a computer program for achieving the functions of the apparatus, the method, and the system described above; a server apparatus for distributing the computer program; and a storage medium on which the computer program is stored.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. Embodiment

Figure 1:
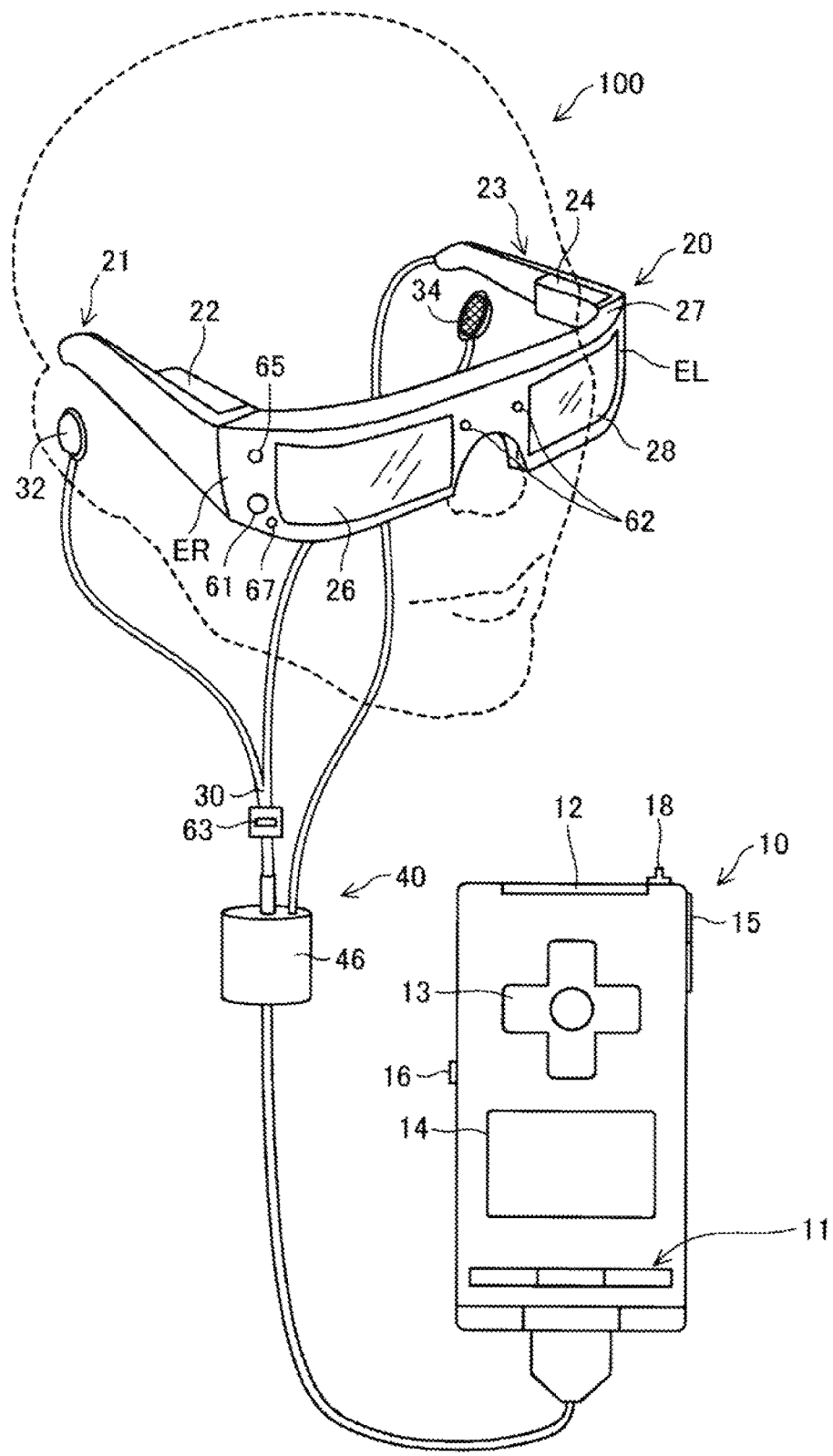
FIG. 1 shows the exterior configuration of an HMD in an embodiment of the invention.

A-1. Configuration of HMD:

FIG. 1 shows the exterior configuration of an HMD (head mounted display) 100 in an embodiment of the invention. The HMD 100 is a display apparatus including an image display section 20 (display section), which is mounted on a user's head and allows the user to visually recognize a virtual image, and a control apparatus 10 (control section), which controls the image display section 20. The control apparatus 10 includes a variety of input devices for acquiring the user's operation and functions as a controller that allows the user to operate the HMD 100.

The image display section 20 is a mountable part mounted on the user's head and has a spectacle-like shape in the present embodiment. The image display section 20 includes a main body including a right holder 21, a left holder 23, and a front frame 27, and the main body is provided with a right display unit 22, a left display unit 24, a right light guide plate 26, and a left light guide plate 28.

The right holder 21 and the left holder 23, which extend rearward from opposite ends of the front frame 27, hold the image display section 20 on the user's head as temples (bows) of spectacles do. One of the opposite ends of the front frame 27 or the end located on the right of the user on whom the image display apparatus 20 is mounted is called an end ER, and the other end or the end located on the left of the user is called an end EL. The right holder 21 is so provided as to extend from the end ER of the front frame 27 to a position corresponding to a right temporal region of the user on whom the image display section 20 is mounted. The left holder 23 is so provided as to extend from the end EL of the front frame 27 to a position corresponding to a left temporal region of the user on whom the image display section 20 is mounted.

The right light guide plate 26 and the left light guide plate 28 are provided as part of the front frame 27. The right light guide plate 26 is located in front of the right eye of the user on whom the image display section 20 is mounted and allows the right eye to visually recognize an image. The left light guide plate 28 is located in front of the left eye of the user on whom the image display section 20 is mounted and allows the left eye to visually recognize an image.

The front frame 27 has a shape that links one end of the right light guide plate 26 and one end of the left light guide plate 28 to each other. The linkage position corresponds to a position between the eyes of the user on whom the image display section 20 is mounted. A nose pad that comes into contact with the nose of the user on whom the image display section 20 is mounted may be provided as part of the front frame 27 and in the position where the right light guide plate 26 and the left light guide plate 28 are linked to each other. In this case, the nose pad, the right holder 21, and the left holder 23 can hold the image display section 20 on the user's head. Further a belt that comes into contact with the back of the head of the user on whom the image display section 20 is mounted may be linked to the right holder 21 and the left holder 23. In this case, the belt can securely hold the image display section 20 on the user's head.

The right display unit 22 displays an image via the right light guide plate 26. The right display unit 22 is provided on the right holder 21 and located in the vicinity of the right temporal region of the user on whom the image display section 20 is mounted. The left display unit 24 displays an image via the left light guide plate 28. The left display unit 24 is provided on the left holder 23 and located in the vicinity of the left temporal region of the user on whom the image display section 20 is mounted. The right display unit 22 and the left display unit 24 are also collectively called "display drivers."

The right light guide plate 26 and the left light guide plate 28 in the present embodiment are each an optical section (prism, for example) made, for example, of a light transmissive resin and guide image light outputted from the right display unit 22 and the left display unit 24 to the user's eyes. A light control plate may be provided on the surface of each of the right light guide plate 26 and the left light guide plate 28. The light control plate is a thin-plate-shaped optical element having transmittance that varies in accordance with the range of the wavelength of light passing therethrough and functions as what is called a wavelength filter. The light control plates are so disposed as to cover, for example, part of the front surface of the front frame 27 (surface opposite the surface facing the user's eyes). Appropriate selection of optical characteristics of the light control plates allows adjustment of light transmittance in an arbitrary wavelength range, such as visible light, infrared light, and ultraviolet light and therefore allows adjustment of the amount of outside light externally incident on the right light guide plate 26 and the left light guide plate 28 and passing through the right light guide plate 26 and the left light guide plate 28.

The image display section 20 guides the image light produced by the right display unit 22 and the left display unit 24 to the right light guide plate 26 and the left light guide plate 28 and allows the user to visually recognize virtual images produced by the image light (this action is also called "displaying images"). In a case where outside light passes through the right light guide plate 26 and the left light guide plate 28 from the side in front of the user and impinges on the user's eyes, the image light that forms virtual images and the outside light are incident on the user's eyes. The visibility of the virtual images viewed by the user is therefore affected by the intensity of the outside light.

Therefore, for example, attaching the light control plates to the front frame 27 and selecting or adjusting the optical characteristics of the light control plates as appropriate allow adjustment of the visibility of the virtual images. In a typical example, light control plates having light transmittance high enough to at least allow the user on whom the HMD 100 is mounted to visually recognize an outside scene can be selected. When the light control plates are used, it can be expected to achieve an effect of protecting the right light guide plate 26 and the left light guide plate 28 and suppressing damage of the right light guide plate 26 and the left light guide plate 28, adhesion of dirt thereto, and other undesirable effects thereon. The light control plates may be attachable to and detachable from the front frame 27 or the right light guide plate 26 and the left light guide plate 28. A plurality of types of light control plates may be changed from one to another in an attachable/detachable manner, or the light control plates may be omitted.

A camera 61 is disposed in the front frame 27 of the image display section 20. The camera 61 is provided in the front surface of the front frame 27 and in a position where the camera 61 does not block the outside light passing through the right light guide plate 26 and the left light guide plate 28. In the example shown in FIG. 1, the camera 61 is disposed on the side facing the end ER of the front frame 27. The camera 61 may instead be disposed on the side facing the end EL of the front frame 27 or in the portion where the right light guide plate 26 and the left light guide plate 28 are linked to each other.

The camera 61 is a digital camera including an imaging element, such as a CCD or a CMOS element, an imaging lens, and other components. The camera 61 in the present embodiment is a monocular camera but may instead be a stereocamera. The camera 61 captures an image of at least part of an outside scene (real space) in the direction extending from the front side of the HMD 100, in other words, in the direction toward the visual field of the user on whom the image display section 20 is mounted. In other words, the camera 61 performs imaging over the range or in the direction that overlaps with the user's visual field and performs imaging in the direction in which the user gazes. The angle of view of the camera 61 can be set as appropriate. In the present embodiment, the angle of view of the camera 61 is so set that the camera 61 captures an image of the user's entire visual field over which the user can gaze through the right light guide plate 26 and the left light guide plate 28. The camera 61 performs imaging under the control of a control section 150 (FIG. 5) and outputs captured image data to the control section 150. The camera 61 cooperates with the control section 150 to function as an "acquisition section."

An inside camera 62 is a digital camera including an imaging element, such as a CCD or a CMOS element, an imaging lens, and other components, as the camera 61 is. The inside camera 62 performs imaging in the direction toward the interior of the HMD 100, in other words, in the direction toward the user on whom the image display section 20 is mounted. The inside camera 62 in the present embodiment includes an inside camera for capturing an image of the user's right eye and an inside camera for capturing an image of the user's left eye. The angle of view of the inside camera 62 can be set as appropriate, as in the case of the camera 61. The angle of view of the inside camera 62 is preferably so set that the inside camera 62 can capture an image of the user's entire right eye or left eye. The inside camera 62 performs imaging under the control of the control section 150 (FIG. 5) and outputs captured image data to the control section 150, as the camera 61 does. The inside camera 62 cooperates with the control section 150 to function as a "sight line detection section."

The HMD 100 may include a distance measuring sensor that detects the distance to a measurement target object positioned in a measurement direction set in advance. The distance measuring sensor can, for example, be disposed in a portion of the front frame 27 or the portion where the right light guide plate 26 and the left light guide plate 28 are linked to each other. The measurement direction of the distance measuring sensor can be a direction extending from the front side of the HMD 100 (direction that overlaps with the imaging direction of the camera 61). The distance measuring sensor can be formed, for example, of a light emitter, such as an LED and a laser diode, and a light receiver that receives light emitted from the light source and reflected off the measurement target object. In this case, the distance is determined by triangulation or a distance measurement process based on time difference. The distance measuring sensor may instead be formed, for example, of a transmitter that emits an ultrasonic wave and a receiver that receives the ultrasonic wave reflected off the measurement target object. In this case, the distance is determined by a distance measurement process based on time difference. The distance measuring sensor is controlled by the control section 150 and outputs a result of the detection to the control section 150, as in the case of the camera 61.

Figure 2:
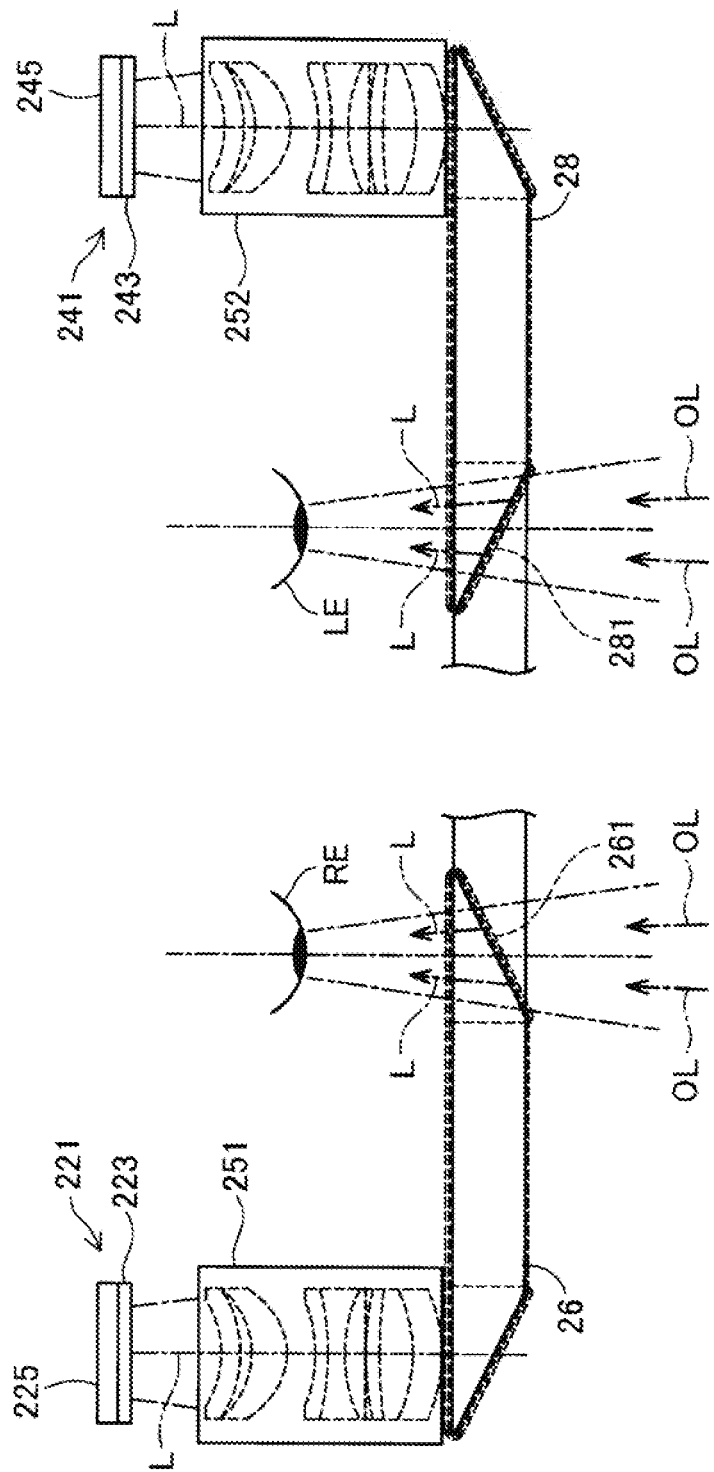
FIG. 2 is a key part plan view showing the configuration of an optical system provided in an image display section.

FIG. 2 is a key part plan view showing the configuration of an optical system provided in the image display section 20. FIG. 2 shows the user's right eye RE and left eye LE for ease of description. The right display unit 22 and the left display unit 24 are configured to have a bilaterally symmetric structure, as shown in FIG. 2.

As the configuration that allows the right eye RE to visually recognize a virtual image, the right display unit 22 as a right image display section includes an OLED (organic light emitting diode) unit 221 and a right optical system 251. The OLED unit 221 emits image light. The right optical system 251 includes lens groups and other components and guides the image light L emitted from the OLED unit 221 to the right light guide plate 26.

The OLED unit 221 includes an OLED panel 223 and an OLED drive circuit 225, which drives the OLED panel 223. The OLED panel 223 is a self-luminous display panel formed of light emitting elements that emit R (red), G (green), and B (blue) color light fluxes on the basis of organic electroluminescence. The OLED panel 223 has a plurality of pixels arranged in a matrix, and each of the pixels is a light emitting unit formed of one R element, one G element, and one B element.

Figure 5:
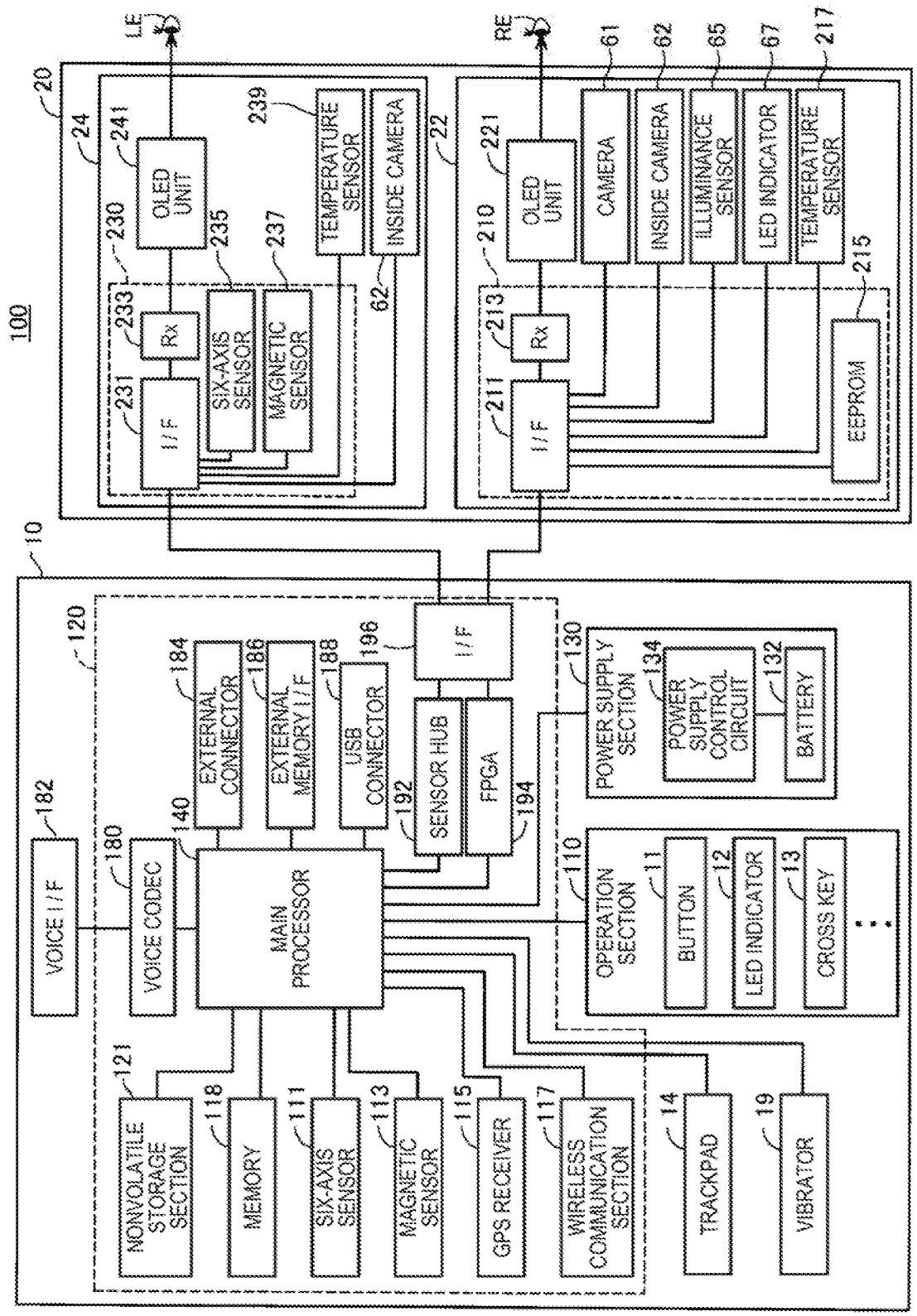
FIG. 5 is a functional block diagram showing the configuration of the HMD.

The OLED drive circuit 225 selects a light emitting element provided in the OLED panel 223 and supplies the light emitting element with electric power to cause the light emitting element to emit light under the control of the control section 150 (FIG. 5). The OLED drive circuit 225 is fixed to the rear surface of the OLED panel 223, that is, the rear side of the light emitting surface, for example, in a bonding process. The OLED drive circuit 225 may be formed, for example, of a semiconductor device that drives the OLED panel 223 and mounted on a substrate fixed to the rear surface of the OLED panel 223. A temperature sensor 217, which will be described later, is mounted on the substrate. The OLED panel 223 may instead have a configuration in which light emitting elements that emit white light are arranged in a matrix and color filters corresponding to the R, G, and B three colors are so disposed as to be superimposed on the light emitting elements. Still instead, an OLED panel 223 having a WRGB configuration including light emitting elements that radiate W (white) light in addition to the light emitting elements that radiate the R, G, and B color light fluxes may be employed.

The right optical system 251 includes a collimator lens that converts the image light L outputted from the OLED panel 223 into a parallelized light flux. The image light L having been converted by the collimator lens into a parallelized light flux is incident on the right light guide plate 26. A plurality of reflection surfaces that reflect the image light L are formed along the optical path that guides the light in the right light guide plate 26. The image light L undergoes reflection multiple times in the right light guide plate 26 and is guided toward the right eye RE. A half-silvered mirror 261 (reflection surface) located in front of the right eye RE is formed on the right light guide plate 26. The image light L is reflected off the half-silvered mirror 261, then exits out of the right light guide plate 26 toward the right eye RE, and forms an image on the retina of the right eye RE, whereby a virtual image is visually recognized by the user.

As the configuration that allows the left eye LE to visually recognize a virtual image, the left display unit 24 as a left image display section includes an OLED unit 241 and a left optical system 252. The OLED unit 241 emits image light. The left optical system 252 includes lens groups and other components and guides the image light L emitted from the OLED unit 241 to the left light guide plate 28. The OLED unit 241 includes an OLED panel 243 and an OLED drive circuit 245, which drives the OLED panel 243. Details of the portions described above are the same as those of the OLED unit 221, the OLED panel 223, and the OLED drive circuit 225. A temperature sensor 239 is mounted on a substrate fixed to the rear surface of the OLED panel 243. Details of the left optical system 252 are the same as those of the right optical system 251.

The HMD 100 having the configuration described above can function as a see-through-type display apparatus. That is, on the user's right eye RE are incident the image light L reflected off the half-silvered mirror 261 and outside light OL having passed through the right light guide plate 26. On the user's left eye LE are incident the image light L reflected off the half-silvered mirror 281 and outside light OL having passed through the left light guide plate 28. The HMD 100 thus causes the image light L carrying internally processed images and the outside light OL to be superimposed on each other and causes the superimposed light to be incident on the user's eyes. As a result, the user views an outside scene (real world) through the right light guide plate 26 and the left light guide plate 28 and visually recognizes virtual images formed by the image light L and superimposed on the outside scene. That is, the image display section 20 of the HMD 100 transmits the outside scene to allow the user to visually recognize the outside scene in addition to the virtual images.

The half-silvered mirror 261 and the half-silvered mirror 281 function as "image extracting sections" that reflect the image light outputted from the right display unit 22 and the left display unit 24 and extract images from the image light. The right optical system 251 and the right light guide plate 26 are also collectively called a "right light guide unit," and the left optical system 252 and the left light guide plate 28 are also collectively called a "left light guide unit." The configuration of the right and left light guide units is not limited to the example described above and can be arbitrarily configured as long as the image light is used to form virtual images in positions in front of the user's eyes. A diffraction grating or a half-transmissive/reflective film may, for example, be used as each of the right and left light guide units.

In FIG. 1, the control apparatus 10 and the image display section 20 are connected to each other via a connection cable 40. The connection cable 40, which is detachably connected to a connector provided on the lower side of the control apparatus 10, is inserted through the end of the left holder 23 and connected to a variety of circuits in the image display section 20. The connection cable 40 includes a metal cable or an optical fiber cable through which digital data is transmitted. The connection cable 40 may further include a metal cable through which analog data is transmitted. A connector 46 is provided in a halfway position along the connection cable 40.

The connector 46 is a jack to which a stereo mini plug is connected, and the connector 46 is connected to the control apparatus 10, for example, via a line through which an analog voice signal is transmitted. A headset 30 including a right earphone 32 and a left earphone 34, which form a stereo headphone, and a microphone 63 is connected to the connector 46. The microphone 63 is so disposed that a sound collector of the microphone 63 faces in the direction of the user's sight line as shown, for example, in FIG. 1. The microphone 63 collects voice and outputs a voice signal to a voice interface 182 (FIG. 5). The microphone 63 may be a monaural microphone, a stereo microphone, a directional microphone, or an omni-directional microphone.

The control apparatus 10 includes, as an input/output user interface, buttons 11, an LED indicator 12, a cross key 13, a trackpad 14, up/down keys 15, a changeover switch 16, and a power switch 18.

The buttons 11 are formed of a menu key, a home key, a return key, and other switches for operating or otherwise manipulating an OS (operation system) 143 (FIG. 6) executed by the control apparatus 10. The buttons 11 in the present embodiment are buttons that are displaced in response to operation of pressing the keys and switches. The LED indicator 12 goes on and off in correspondence with the action state of the HMD 100. The cross key 13 detects operation of touching or pressing a key corresponding to any of the upward, downward, rightward, leftward, and central portions of the cross key 13 and outputs a signal according to the content of the detection. The cross key 13 in the present embodiment is so configured that a finalizing button having a circular shape is disposed at the center and an upper button, a lower button, a right button, and a left button are disposed in the upward, downward, rightward, and leftward directions with respect to the finalizing button. Each of the buttons can be implemented in a variety of aspects and may, for example, be a capacitance button or a mechanical-contact button.

The trackpad 14 has an operation surface that detects contact operation, detects contact operation performed on the operation surface, and outputs a signal according to the content of the detection. A method for detecting contact operation can be an electrostatic method, a pressure detection method, an optical method, or any of a variety of other methods. The up/down keys 15 detect instruction operation for increasing and decreasing the magnitude of sound outputted from the earphones of the headset 30 and instruction operation for increasing and decreasing the brightness of an image displayed by the image display section 20. The changeover switch 16 detects operation of switching the target of the instruction issued by the up/down keys 15 from one to the other (magnitude of sound, brightness of image). The power switch 18 detects operation of powering on and off the HMD 100 (ON, OFF). The power switch 18 can be formed, for example, of a slide switch.

Figure 3:
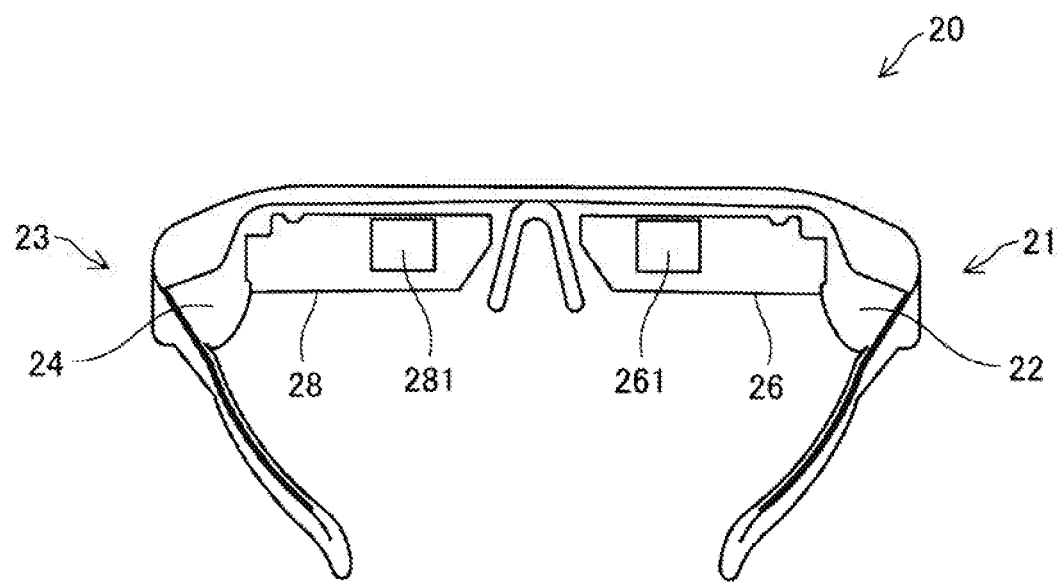
FIG. 3 shows the configuration of key parts of the image display section viewed from a user.

FIG. 3 shows the configuration of key parts of the image display section 20 viewed from the user. In FIG. 3, the connection cable 40, the right earphone 32, and the left earphone 34 are omitted. In the state shown in FIG. 3, the rear side of the right light guide plate 26 and the left light guide plate 28 can be visually recognized, and the half-silvered mirror 261 for irradiating the right eye RE with image light and the half-silvered mirror 281 for irradiating the left eye LE with image light can be visually recognized as roughly quadrangular regions. The user therefore visually recognizes an outside scene through the entire right light guide plate 26 and left light guide plate 28 including the half-silvered mirrors 261 and 281 and further visually recognizes rectangular displayed images in the positions of the half-silvered mirrors 261 and 281.

Figure 4:
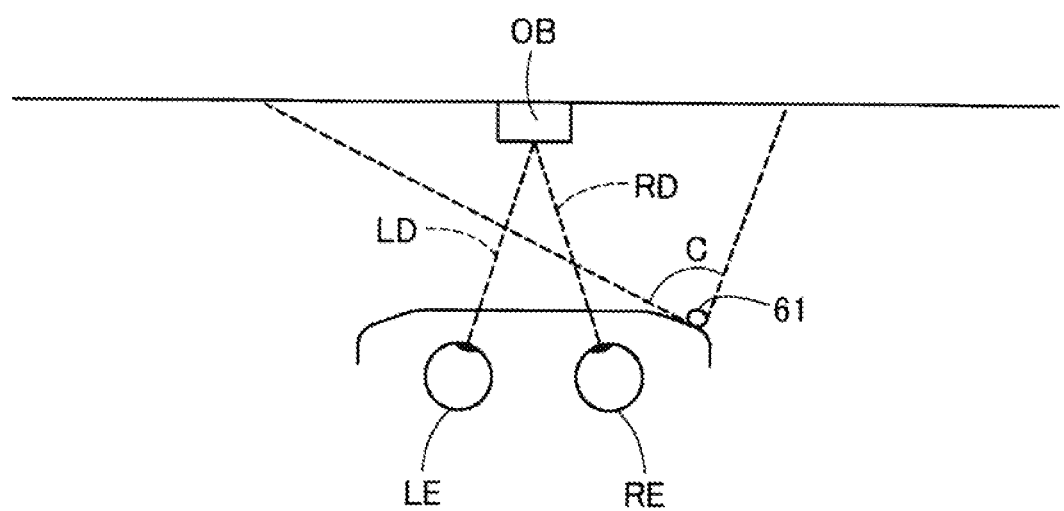
FIG. 4 describes the angle of view of a camera.

FIG. 4 describes the angle of view of the camera 61. FIG. 4 diagrammatically shows the camera 61 and the user's right eye RE and left eye LE in a plan view and further shows the angle of view (imaging range) C of the camera 61. It is noted that the actual angle of view C of the camera 61 has a horizontal range, as shown in FIG. 4, and also has a vertical range, as in the case of a typical digital camera.

The camera 61 is disposed in a right end portion of the image display section 20 and performs imaging in the direction of the user's sight line (that is, captures an image of a space in front of the user), as described above. The optical axis of the camera 61 therefore falls within the range containing the directions of the sight lines from the right eye RE and the left eye LE. The outside scene visually recognizable by the user on whom the HMD 100 is mounted is not limited to the infinity. For example, when the user gazes at a target object OB with the two eyes, the user's sight lines are directed toward the target object OB, as indicated by reference characters RD and LD in FIG. 4. In this case, the distance from the user to the target object OB ranges from about 30 cm to 10 m in many instances, and the distance is more likely to range from 1 to 4 m. In view of the fact described above, guideline values of the upper and lower limits of the distance from the user to the target object OB in typical conditions under which the HMD 100 is used may be set. The guideline values may be determined in advance and preset in the HMD 100 or may be set by the user. The optical axis and the angle of view of the camera 61 are preferably so set that the target object OB falls within the angle of view in a case where the distance to the target object OB under the typical use conditions is equal to the set guideline values of the upper and lower limits.

In general, it is believed that a person's angular field of view is about 200 degrees in the horizontal direction and about 125 degrees in the vertical direction. Within these ranges, an effective field of view, where the person has excellent information reception capability, extends over a horizontal range of about 30 degrees and a vertical range of about 20 degrees. It is further believed that a stable field of fixation, where a point of fixation at which the person gazes is viewed in a quick, stable manner, extends over a horizontal range from about 60 to 90 degrees and a vertical range from about 45 to 70 degrees. In this case, when the point of fixation coincides with the target object OB (FIG. 4), the effective field of view extends over the horizontal range of about 30 degrees and the vertical range of about 20 degrees around the sight lines RD and LD. The stable field of fixation extends over the horizontal range from about 60 to 90 degrees and the vertical range from about 45 to 70 degrees around the sight lines RD and LD. The actual field of view visually recognized by the user through the image display section 20 and further through the right light guide plate 26 and the left light guide plate 28 is called an actual field of view (FOV). The actual field of view is narrower than the angular field of view and the stable field of fixation but wider than the effective field of view.

The angle of view C of the camera 61 in the present embodiment is so set as to allow imaging over a range wider than the user's field of view. The angle of view C of the camera 61 is preferably so set as to allow imaging over a range at least wider than the user's effective field of view and is more preferably so set as to allow imaging over a range wider than the actual field of view. The angle of view C of the camera 61 is further preferably so set as to allow imaging over a range wider than the user's stable field of fixation and is most preferably so set as to allow imaging over a range wider than the user's binocular angular field of view. To this end, the camera 61 may include what is called a wide-angle lens as the imaging lens for imaging over a wide angle of view. The wide-angle lens may include a lens called a super-wide-angle lens or a semi-wide-angle lens. The camera 61 may include a fixed-focal-length lens, a zoom lens, or a lens group formed of a plurality of lenses.

FIG. 5 is a functional block diagram of the configuration of the HMD 100. The control apparatus 10 includes a main processor 140, which executes a program to control the HMD 100, a storage section, an input/output section, a variety of sensors, an interface, and a power supply section 130. The storage section, the input/output section, the variety of sensors, the interface, and the power supply section 130 are connected to the main processor 140. The main processor 140 is mounted on a controller substrate 120 built in the control apparatus 10.

The storage section includes a memory 118 and a nonvolatile storage section 121. The memory 118 forms a work area that temporarily stores a computer program executed by the main processor 140 and data processed by the main processor 140. The nonvolatile storage section 121 is formed of a flash memory or an eMMC (embedded multimedia card). The nonvolatile storage section 121 stores the computer program executed by the main processor 140 and a variety of data processed by the main processor 140. In the present embodiment, these storage sections are mounted on the controller substrate 120.

The input/output section includes the trackpad 14 and an operation section 110. The operation section 110 includes the buttons 11, the LED indicator 12, the cross key 13, the trackpad 14, the up/down keys 15, the changeover switch 16, and the power switch 18 described above. The main processor 140 controls these input/output sections described above and acquires signals outputted from the input/output sections.

The variety of sensors include a six-axis sensor 111, a magnetic sensor 113, and a GPS (global positioning system) 115. The six-axis sensor 111 is a motion sensor (inertia sensor) including a three-axis acceleration sensor and a three-axis gyro (angular velocity) sensor. The six-axis sensor 111 may be an IMU (inertial measurement unit) formed of the sensors described above as a modular part. The magnetic sensor 113 is, for example, a three-axis geomagnetic sensor. The GPS 115 includes a GPS antenna that is not shown and receives wireless signals transmitted from GPS satellites to detect the coordinates of the current position of the control apparatus 10. The variety of sensors (six-axis sensor 111, magnetic sensor 113, and GPS 115) output detection values to the main processor 140 in accordance with sampling frequencies specified in advance. Each of the sensors may instead output a detection value at a point of time according to an instruction from the main processor 140.

The interface includes a communication section 117, a voice codec 180, an external connector 184, an external memory interface 186, a USB (universal serial bus) connector 188, a sensor hub 192, an FPGA 194, and an interface 196. Each of these components functions as an interface with an external apparatus. The communication section 117 performs wireless communication between the HMD 100 and an external apparatus. The communication section 117 includes an antenna, an RF circuit, a baseband circuit, a communication control circuit, and other components that are not shown or is formed as a device formed of the above components integrated with one another. The communication section 117 performs wireless communication that complies, for example, with a wireless LAN standard including Bluetooth (registered trademark) and Wi-Fi.

The voice codec 180 is connected to the voice interface 182 and decodes/encodes a voice signal inputted and outputted via the voice interface 182. The voice codec 180 may have the function of processing voice inputted and outputted via the built-in headset 30. Further, to process voice signals inputted and outputted via the built-in headset 30, the voice codec 180 may include an A/D converter that converts an analog voice signal into digital voice data and a D/A converter that performs conversion in the opposite direction. The A/D converter converts an analog voice signal inputted via the microphone 63 into digital voice data and outputs the digital voice data to the main processor 140. The D/A converter converts digital voice data outputted from the main processor 140 into an analog voice signal and outputs the analog voice signal to the right earphone 32 and the left earphone 34. The voice interface 182 is an interface via which a voice signal is inputted to and outputted from the headset 30.

The external connector 184 is a connector that connects an external apparatus (personal computer, smartphone, and game console, for example) that communicates with the main processor 140 to the main processor 140. The external apparatus connected to the external connector 184 can be a content supply source and can also be used to debug of the computer program executed by the main processor 140 and collect action logs of the HMD 100. The external connector 184 can be implemented in a variety of aspects. Examples of the external connector 184 can be a USB interface, a micro USB interface, a memory card interface, or any other interface corresponding to wired connection, or a wireless LAN interface, a Bluetooth interface, or any other interface corresponding to wireless connection.

The external memory interface 186 is an interface that allows connection to a portable memory device. The external memory interface 186 includes, for example, a memory card slot into which a card-shaped recording medium is inserted and via which data is read and written and an interface circuit. The size, shape, standard, and other factors of the card-shaped recording medium can be selected as appropriate. The USB connector 188 is an interface that allows connection to a memory device, a smartphone, a personal computer, and other devices that comply with a USB standard. The USB connector 188 includes, for example, a connector that complies with the USB standard and an interface circuit. The size, shape, USB standard version, and other factors of the USB connector 188 can be selected as appropriate.

The HMD 100 further includes a vibrator 19. The vibrator 19 includes a motor, an off-center rotator, and other components that are not shown and produces vibration under the control of the main processor 140. The HMD 100 causes the vibrator 19 to produce vibration in a predetermined vibration pattern, for example, when operation performed on the operation section 110 is detected or when the HMD 100 is powered on and off.

The sensor hub 192 and the FPGA 194 are connected to the image display section 20 via the interface (I/F) 196. The sensor hub 192 acquires detection values from the variety of sensors provided in the image display section 20 and outputs the detection values to the main processor 140. The FPGA 194 processes data transmitted from the main processor 140 and received by the portions of the image display section 20 and vice versa and transports the processed data via the interface 196. The interface 196 is connected to the right display unit 22 and the left display unit 24 of the image display section 20. In the example of the present embodiment, the connection cable 40 is connected to the left holder 23, and a wiring line that leads to the connection cable 40 is routed in the image display section 20, whereby the right display unit 22 and the left display unit 24 are connected to the interface 196 of the control apparatus 10.

The power supply section 130 includes a battery 132 and a power supply control circuit 134. The power supply section 130 supplies electric power that allows the control apparatus 10 to operate. The battery 132 is a chargeable cell. The power supply control circuit 134 detects the amount of remaining electric power in the battery 132 and controls electric charging to the battery 132. The power supply control circuit 134 is connected to the main processor 140 and outputs a detection value representing the amount of remaining electric power in the battery 132 and a detection value representing the voltage across the battery 132 to the main processor 140. Electric power may further be supplied from the control apparatus 10 to the image display section 20 on the basis of the electric power supplied from the power supply section 130. The main processor 140 may be configured to be capable of controlling the state of electric power supply from the power supply section 130 to the portions of the control apparatus 10 and the image display section 20.

The right display unit 22 includes a display unit substrate 210, the OLED unit 221, the camera 61, an illuminance sensor 65, an LED indicator 67, and the temperature sensor 217. On the display unit substrate 210 are mounted an interface (I/F) 211 connected to the interface 196, a receiver (Rx) 213, and an EEPROM (electrically erasable programmable read-only memory) 215. The receiver 213 receives data inputted from the control apparatus 10 via the interface 211. The receiver 213, when it receives image data on an image to be displayed by the OLED unit 221, outputs the received image data to the OLED drive circuit 225 (FIG. 2).

The EEPROM 215 stores a variety of types of data in a form readable by the main processor 140. The EEPROM 215 stores, for example, data on light emission characteristics and display characteristics of the OLED units 221 and 241 of the image display section 20, data on sensor characteristics of the right display unit 22 or the left display unit 24, and other types of data. Specifically, for example, the EEPROM 215 stores a parameter relating to correction of the gamma values of the OLED units 221 and 241, data used to compensate detection values from the temperature sensors 217 and 239, which will be described later, and other types of data. The data described above are produced when the HMD 100 is inspected just before the HMD 100 is shipped from the factory and written onto the EEPROM 215. After the shipment, the main processor 140 reads the data in the EEPROM 215 and uses the data in a variety of processes.

The camera 61 performs the imaging in accordance with a signal inputted via the interface 211 and outputs captured image data or a signal representing an imaging result to the control apparatus 10. The illuminance sensor 65 is provided at the end ER of the front frame 27 and so disposed as to receive outside light from a space in front of the user on whom the image display section 20 is mounted, as shown in FIG. 1. The illuminance sensor 65 outputs a detection value corresponding to the amount of received light (intensity of received light). The LED indicator 67 is disposed at the end ER of the front frame 27 and in the vicinity of the camera 61, as shown in FIG. 1. The LED indicator 67 illuminates when the camera 61 is performing imaging to notify the user that the imaging is underway.

The temperature sensor 217 detects temperature and outputs a voltage value or a resistance value corresponding to the detected temperature. The temperature sensor 217 is mounted on the rear side of the OLED panel 223 (FIG. 2). The temperature sensor 217 may be mounted, for example, on the substrate on which the OLED drive circuit 225 is mounted. In the configuration described above, the temperature sensor 217 primarily detects the temperature of the OLED panel 223. The temperature sensor 217 may instead be built in the OLED panel 223 or the OLED drive circuit 225. For example, in a case where the OLED panel 223 is implemented as an Si-OLED, along with the OLED drive circuit 225, in the form of an integrated circuit on a unified semiconductor chip, the temperature sensor 217 may be mounted on the semiconductor chip.

The left display unit 24 includes a display unit substrate 230, the OLED unit 241, and a temperature sensor 239. On the display unit substrate 230 are mounted an interface (I/F) 231 connected to the interface 196, a receiver (Rx) 233, a six-axis sensor 235, and a magnetic sensor 237. The receiver 233 receives data inputted from the control apparatus 10 via the interface 231. The receiver 233, when it receives image data on an image to be displayed by the OLED unit 241, outputs the received image data to the OLED drive circuit 245 (FIG. 2).

The six-axis sensor 235 is a motion sensor (inertia sensor) including a three-axis acceleration sensor and a three-axis gyro (angular velocity) sensor. The six-axis sensor 235 may be an IMU formed of the sensors described above as a modular part. The magnetic sensor 237 is, for example, a three-axis geomagnetic sensor. The temperature sensor 239 detects temperature and outputs a voltage value or a resistance value corresponding to the detected temperature. The temperature sensor 239 is mounted on the rear side of the OLED panel 243 (FIG. 2). The temperature sensor 239 may be mounted, for example, on the substrate on which the OLED drive circuit 245 is mounted. In the configuration described above, the temperature sensor 239 primarily detects the temperature of the OLED panel 243. The temperature sensor 239 may instead be built in the OLED panel 243 or the OLED drive circuit 245. Details of the temperature sensor 239 are the same as those of the temperature sensor 217.

The camera 61, the illuminance sensor 65, and the temperature sensor 217 of the right display unit 22, and the six-axis sensor 235, the magnetic sensor 237, and the temperature sensor 239 of the left display unit 24 are connected to the sensor hub 192 of the control apparatus 10. The sensor hub 192 sets and initializes, under the control of the main processor 140, the sampling cycle in accordance with which each of the sensors performs detection. The sensor hub 192, for example, conducts electricity to each of the sensors, transmits control data thereto, and acquires a detection value therefrom in accordance with the sampling cycle in accordance with which the sensor performs detection. The sensor hub 192 outputs detection values from the sensors provided in the right display unit 22 and the left display unit 24 at preset timing to the main processor 140. The FPGA 194 may have a cache function of temporarily holding the detection values from the sensors. The sensor hub 192 may have the function of converting the signal format and data format of the detection values from the sensors (function of converting different formats into a unified format, for example). The FPGA 194 starts and stops conducting electricity to the LED indicator 67 under the control of the main processor 140 to turn on and off the LED indicator 67.

Figure 6:
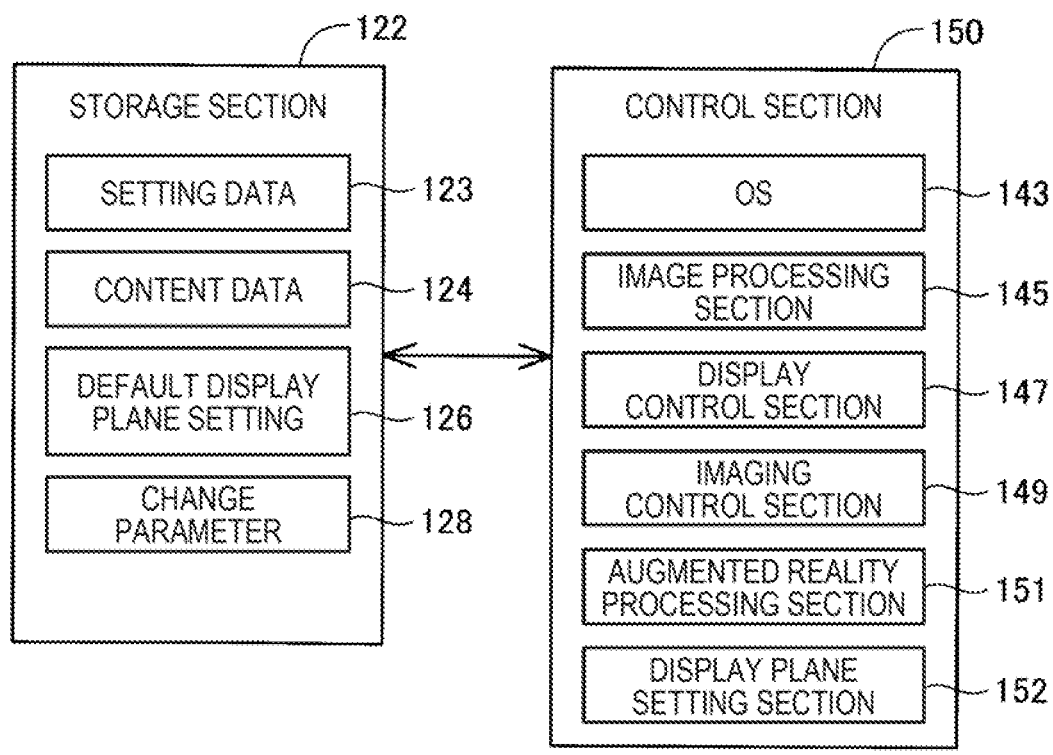
FIG. 6 is a functional block diagram showing the configuration of a control function section of the HMD.

FIG. 6 is a functional block diagram showing the configuration of a control function section of the HMD 100. The control function section of the HMD 100 includes a storage section 122 and the control section 150. The storage section 122 is a logical storage section formed of the nonvolatile storage section 121 (FIG. 5). FIG. 6 shows an example in which only the storage section 122 is used, and the nonvolatile storage section 121 may be combined with the EEPROM 215 and the memory 118 and used as the storage section 122. The control section 150 is achieved when the main processor 140 executes the computer program, that is, when the hardware and the software cooperate with each other.

The storage section 122 stores a variety of data used in processes carried out by the control section 150. Specifically, the storage section 122 in the present embodiment stores setting data 123, content data 124, a default display plane setting 126, and a change parameter 128. The default display plane setting 126 will be described later in detail. The change parameter 128 is a parameter set in a display plane setting process, which will be described later, and stores zero in the initial state.

The setting data 123 contains a variety of setting values associated with the action of the HMD 100. For example, the setting data 123 contains a parameter, a determinant, an arithmetic expression, an LUT (lookup table), and other factors used when the control section 150 controls the HMD 100.

The content data 124 contains data on contents containing still images and video images to be displayed by the image display section 20 under the control of the control section 150 (such as still image data, video image data, and voice data). The content data 124 may contain data on bidirectional contents. A bidirectional content means a content that causes the control apparatus 10 to acquire the user's operation, causes the control section 150 to carry out a process according to the acquired operation, and causes the image display section 20 to display a content according to the process. In this case, the content data may contain image data on a menu screen for acquiring the user's operation, data that specifies a process corresponding to each item contained in the menu screen, and other types of data.

The control section 150 uses the data stored in the storage section 122 to carry out a variety of processes to perform the functions of the OS 143, an image processing section 145, a display control section 147, an imaging control section 149, an augmented reality processing section 151, and a display plane setting section 152. In the present embodiment, each of the functional sections excluding the OS 143 is achieved by an application program run on the OS 143.

The image processing section 145 produces signals to be transmitted to the right display unit 22 and the left display unit 24 on the basis of image data on still images/video images to be displayed by the image display section 20. The signals produced by the image processing section 145 may be a vertical sync signal, a horizontal sync signal, a clock signal, an analog image signal, and other signals. The image processing section 145 is not necessarily achieved by the computer program executed by the main processor 140 and may instead be achieved by hardware (DSP (digital signal processor), for example) separate from the main processor 140.

The image processing section 145 may carry out a resolution conversion process, an image adjustment process, a 2D/3D conversion process, and other processes as required. The resolution conversion process is a process of converting the resolution of the image data into resolution suitable for the right display unit 22 and the left display unit 24. The image adjustment process is a process of adjusting the luminance and chroma of the image data. The 2D/3D conversion process is a process of creating 2D image data from 3D image data or creating 3D image data from 2D image data. Having carried out the processes described above, the image processing section 145 produces signals for displaying images on the basis of the processed image data and transmits the signals to the image display section 20 via the connection cable 40.

The display control section 147 produces control signals that control the right display unit 22 and the left display unit 24, and the control signals control the right display unit 22 and the left display unit 24 to cause them to each produce and output image light. Specifically, the display control section 147 controls the OLED drive circuits 225 and 245 to cause them to display images on the OLED panels 223 and 243. The display control section 147 controls the timing at which the OLED drive circuits 225 and 245 draw images on the OLED panels 223 and 243, controls the luminance of the OLED panels 223 and 243, and performs other types of control on the basis of the signals outputted from the image processing section 145.

The imaging control section 149 controls the camera 61 to cause it to perform imaging for generation of captured image data and controls the storage section 122 to cause it to temporarily store the data. In a case where the camera 61 is configured as a camera unit including a circuit that produces captured image data, the imaging control section 149 acquires the captured image data from the camera 61 and temporarily stores the data in the storage section 122.

The augmented reality processing section 151 carries out an augmented reality process. The augmented reality process is a process of causing the image display section 20 to form a virtual image showing a virtual object and includes the following procedures a1 to a3. The term "virtual object" means an object (such as image, letter, and graphic symbol) that does not exist in the environment that actually surrounds the user (hereinafter also simply called "real space"). The virtual object can form a virtual input plane for accepting the user's input and a virtual guide plane for guiding the user to a work procedure, a work content, or any other piece of information that the user should follow.

(a1) The augmented reality processing section 151 determines a virtual object that is the target of the virtual image formation. The virtual object can, for example, be determined in accordance with an application program being executed in the control section 150. For example, in a case where the application program being executed is a work assisting application program used, for example, in a manufacturing industry, the virtual object can be a figure, a symbol, a letter, or an image showing the procedure of work that the user should do next, a software keyboard or buttons for operating the work assisting application program, or any other object. For example, in a case where the application program being executed is a telephone call application program, the virtual object can be letters representing information on the telephone call counterpart, an image of the telephone call counterpart, or a software keyboard or buttons for operating the telephone call application program. The image used herein includes a still image and motion images.

(a2) The augmented reality processing section 151 produces image data that allows the virtual object determined in the procedure a1 to be displayed on a default display plane specified by the default display plane setting 126. Specifically, the augmented reality processing section 151 produces the image data in such a way that a virtual object is so adjusted in terms of position and inclination thereof that the user on whom the HMD 100 is mounted visually recognizes a virtual image showing the virtual object on the default display plane and the other portion of the default display plane is displayed in black. The augmented reality processing section 151 may perform image processing, such as enlargement, reduction, rotation, and trapezoidal correction, on the virtual object determined in the procedure a1 for adjustment of the position and inclination of the virtual object.

(a3) The augmented reality processing section 151 transmits the image data produced in the procedure a2 to the image processing section 145. The image processing section 145 carries out the processes described above on the basis of the received image data.

Figure 7:
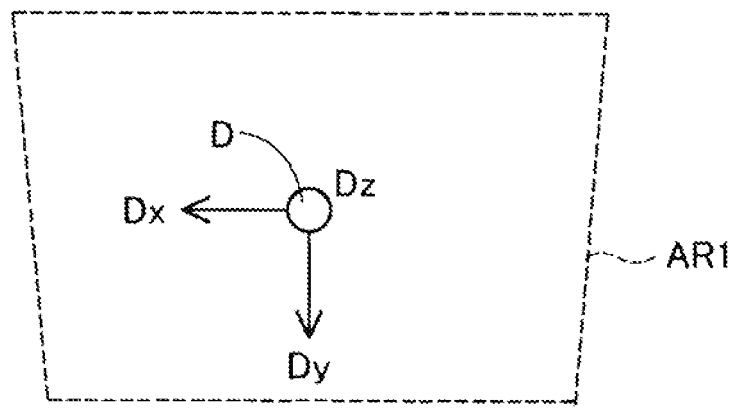
FIG. 7 describes a default display plane.
Figure 7:
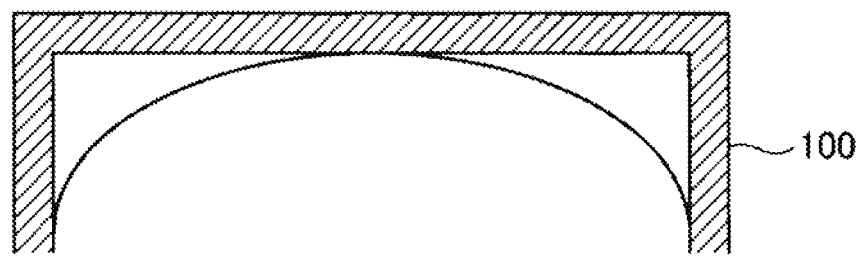

FIG. 7 describes the default display plane. As a result of the execution of the augmented reality process described with reference to the procedures a1 to a3, the user on which the HMD 100 is mounted can visually recognize the virtual object (such as figure, symbol, letter, and image) determined in the procedure a1 in a region AR1 (broken-line rectangle in FIG. 7) in front of the user. That is, the region AR1 shown in FIG. 7 forms the default display plane. The default display plane AR1 is identified by the position of the center of gravity D and plane inclinations Dx, Dy, and Dz in the user's visual field. The default display plane setting 126 (FIG. 6) stores the position of the center of gravity D and the plane inclinations Dx, Dy, and Dz in advance as parameters for identifying the default display plane AR1.

The display plane setting section 152 (FIG. 6) can change the virtual object display plane from the default display plane described with reference to FIG. 7 to an arbitrary display plane specified by the user by carrying out a display plane setting process, which will be described later.

Figure 8:
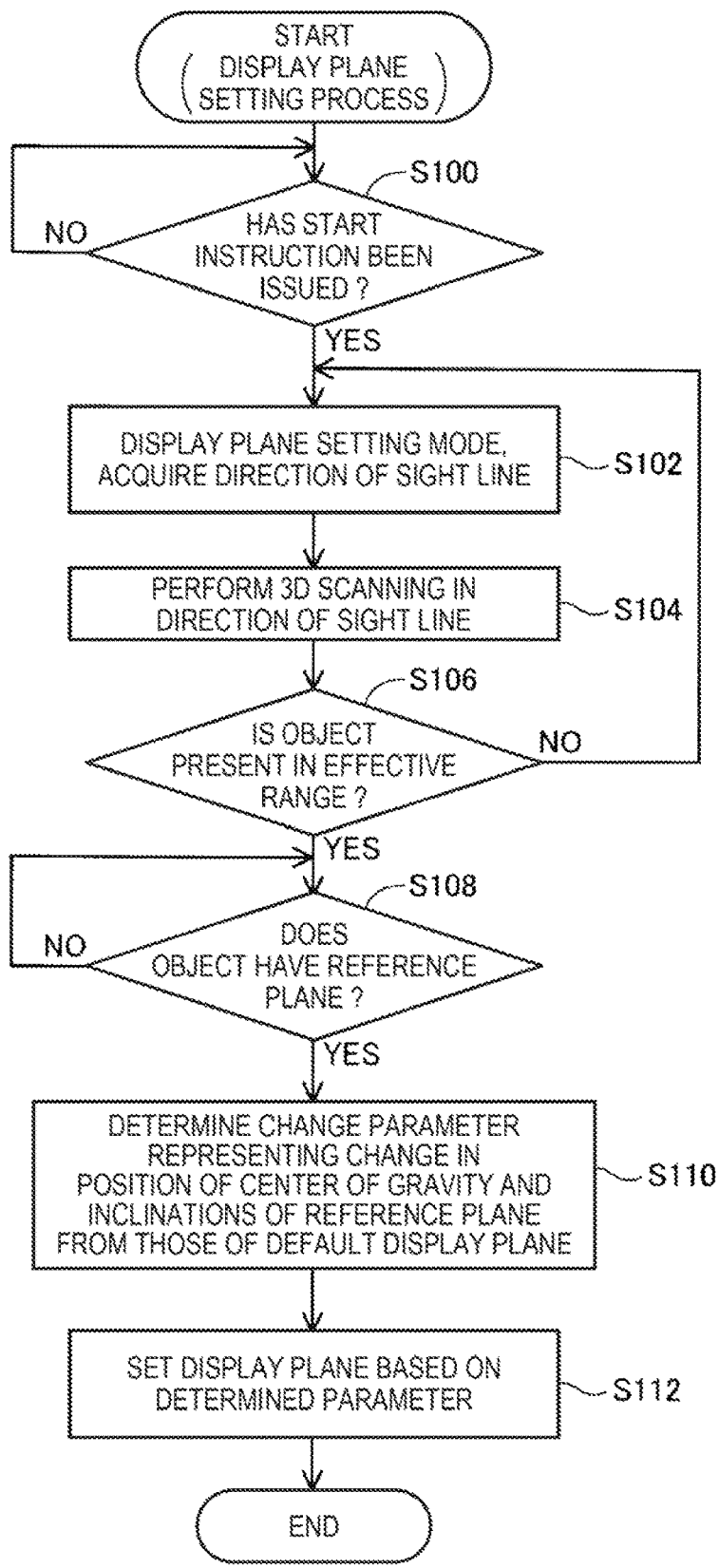
FIG. 8 is a flowchart showing the procedure of a display plane setting process.

A-2. Display Plane Setting Process:

FIG. 8 is a flowchart showing the procedure of the display plane setting process. The display plane setting process is a process of changing the virtual object display plane from the default display plane described with reference to FIG. 7 to an arbitrary display plane specified by the user. The display plane setting process is carried out by the display plane setting section 152 of the control apparatus 10.

In step S100, the display plane setting section 152 evaluates whether or not the user has instructed start of the display plane setting process. The start instruction can be made in an arbitrary aspect. For example, the start instruction can be issued by selection and execution of an icon created on the screen of the OS 143, or a start instruction using a voice command or a start instruction using a gesture command can be used. The instruction of start of the display plane setting process may instead be issued in the form of invocation operation in an arbitrary computer program installed on the OS 143. In a case where no instruction of start of the display plane setting process has been issued (NO in step S100), the display plane setting section 152 returns to step S100 and keeps monitoring the start instruction.

In the case where the instruction of start of the display plane setting process has been issued (YES in step S100), the display plane setting section 152 transitions to a display plane setting mode in step S102. The display plane setting section 152 first acquires the direction of the user's sight line. Specifically, the display plane setting section 152 analyzes an image of the user's right eye and an image of the user's left eye captured with the inside camera 62 to acquire the orientation of the irises of the eyes. The display plane setting section 152 estimates the direction of the user's sight line from the acquired orientation of the irises of the eyes.

Figure 9:
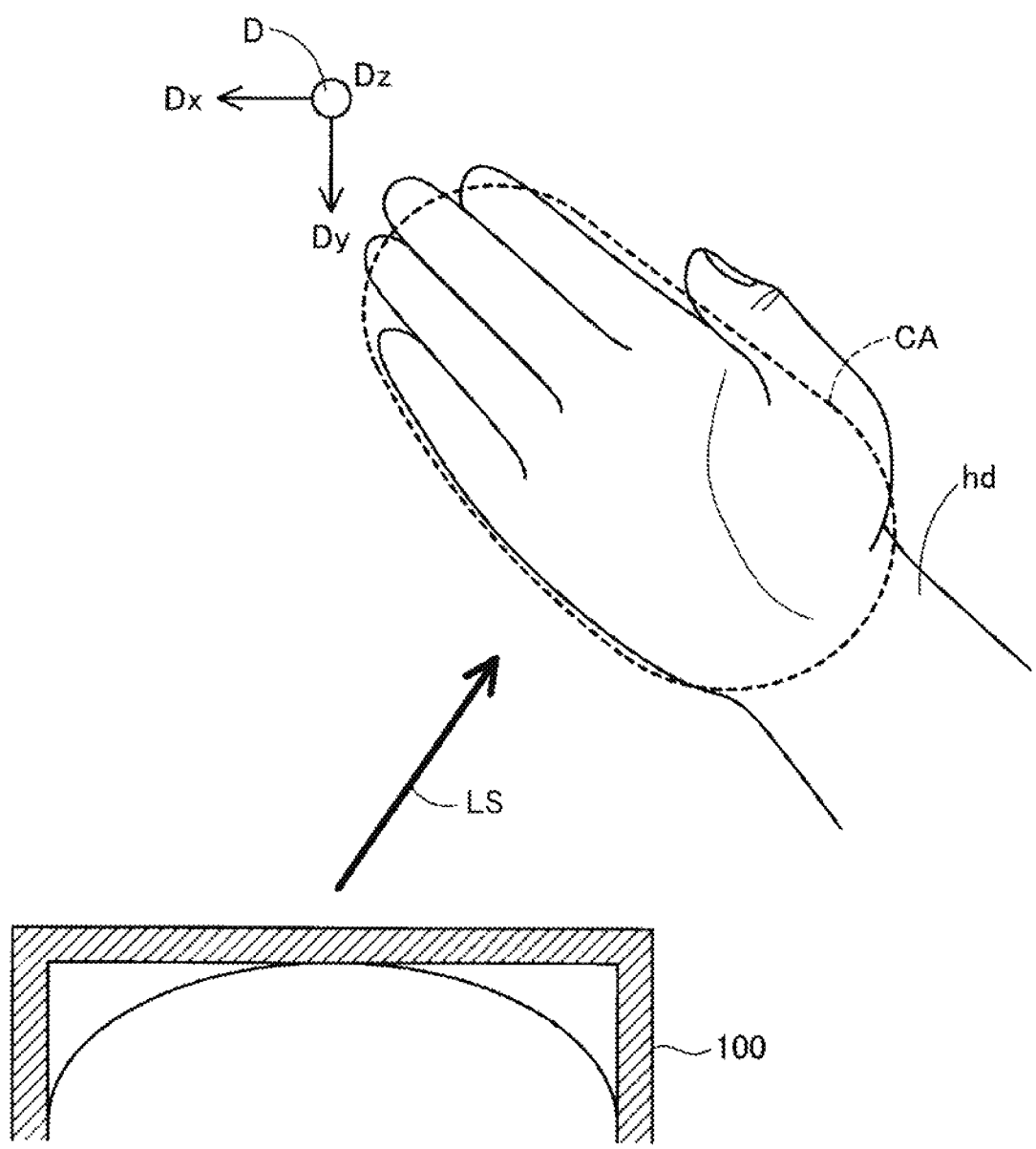
FIG. 9 describes steps S104 to S108 of the display plane setting process.

FIG. 9 describes steps S104 to S108 of the display plane setting process. FIG. 9 and the following figures show the user on whom the HMD 100 is mounted and the user's hand viewed from the upper side of the vertical direction (from user's head top). In step S104, the display plane setting section 152 causes the camera 61 to perform 3D scanning (3D recognition) in the direction of the acquired sight line. The camera 61 in the present embodiment described with reference to FIGS. 1 and 5 includes a laser beam output section that allows 3D scanning in the direction extending from the front side of the HMD 100 (visual field direction along which user on whom image display section 20 is mounted gazes).

Specifically, the laser beam output section of the camera 61 outputs a slit-shaped laser beam in the direction extending from the front side of the HMD 100. The camera 61 receives the outputted light beam reflected off a subject with the CCD or CMOS imaging element. The camera 61 acquires information on the distance to the subject by using the triangulation principle and converts the information into 3D data. Further, the camera 61 spectrally separates received light data by using a rotating filter to acquire color image data having resolution determined in advance by the same CCD or CMOS imaging element. For example, in the example shown in FIG. 9, the display plane setting section 152 can acquire 3D data and color image data on the user's hand hd by causing the camera 61 to perform 3D scanning in the direction of the sight line LS. The 3D data and the color image data obtained in the present step function as "real space information."

In step S106, the display plane setting section 152 evaluates whether or not an object is present within the effective range of the 3D scanning. Specifically, the display plane setting section 152 refers to the 3D data obtained in step S104 and detects an object contained in the 3D data. In a case where a plurality of objects (plurality of hands, hand and fixed object, for example) are present in the 3D data, all the objects are detected in the present step. In a case where no object is present (NO in step S106), the display plane setting section 152 transitions to step S102 and acquires the direction of the user's sight line again. In this process, the display plane setting section 152 may notify the user of a result of the detection representing that no object has been detected or send a message that prompts the user to move the direction of the sight line. The notification can take an arbitrary form, such as the form of a displayed letter or any other object or the form of voice or any other sound.

In the case where objects are present (YES in step S106), the display plane setting section 152 picks up one of the detected objects and evaluates whether or not the object has a reference plane in step S108. In a case where the following conditions b1 and b2 are both satisfied, the display plane setting section 152 in the present embodiment determines that the object has a reference plane. The display plane setting section 152 can evaluate whether or not the object has a reference plane by using a variety of conditions as well as the conditions b1 and b2 presented by way of example. The conditions b1 and b2 correspond to a "predetermined condition."

(b1) An object under evaluation should contain a plane having flatness within a first range. The first range can be set as appropriate and is preferably a range that accepts an object having irregularities to some extent, for example, a human hand, but does not accept an object having large irregularities, such as a human face. Appropriate setting of the first range allows the display plane setting section 152 to suppress wrong recognition.

(b2) The plane described above of the object under evaluation should have an area having at least a second value. The second value can be set as appropriate and is preferably a value that allows exclusion, for example, of hands and faces of other persons remote from the user and other arbitrary objects. Appropriate setting of the second value allows the display plane setting section 152 to suppress wrong recognition.

For example, in the example shown in FIG. 9, the display plane setting section 152 examines and recognizes a flat plane CA (broken line in FIG. 9) formed of the palm and lined-up fingers of the detected object (user's hand hd) as a reference plane CA. In the example shown in FIG. 9, the reference plane CA has an elliptical shape, but the reference plane does not necessarily have a specific shape and can have an arbitrary shape.

In the case where the object under evaluation has no reference plane (NO in step S108), the display plane setting section 152 performs the evaluation in step 3108 successively on the other detected objects. In a case where none of the detected objects has a reference plane, the display plane setting section 152 may transition to step S102 and acquire the direction of the user's sight line again. In this process, the display plane setting section 152 may notify the user of the fact that no object has been detected or send a message that prompts the user to move the direction of the sight line.

The display plane setting section 152 may perform the evaluation in step S108 on part of the detected objects, specifically, an object having a specific feature. As the specific feature, for example, a human hand, the user's hand, an object having a predetermined shape, or an image containing information having a predetermined pattern may be used. The human hand is a hand of any person irrespective of the user or another person. The user's hand means a hand of the user himself or herself who is currently using the HMD 100 and can be identified by referring to the fingerprint or palm print. The object having a predetermined shape can, for example, be a smartphone (device having rectangular shape), a notebook (medium having rectangular shape), the dial of a timepiece (device having rectangular or circular shape), a paper fan (medium having circular shape), and a pen (medium having elongated cylindrical shape). The image containing information having a predetermined pattern can, for example, be a 2D code, such as a QR code (registered trademark), a marker, or any other object. The fingerprint or palm print for recognizing the user's hand, the pattern of an object having a predetermined pattern for recognizing the object, and the pattern in an image containing information having a predetermined pattern for recognizing the image may be stored in the storage section 122 in advance or may be stored in an external device (cloud server, for example) connected to the HMD 100 over a network. Since the process in step S108 is thus carried out only in the case where an object under evaluation has any of the specific features described above, the display plane setting process can be efficiently carried out.

Figure 10:
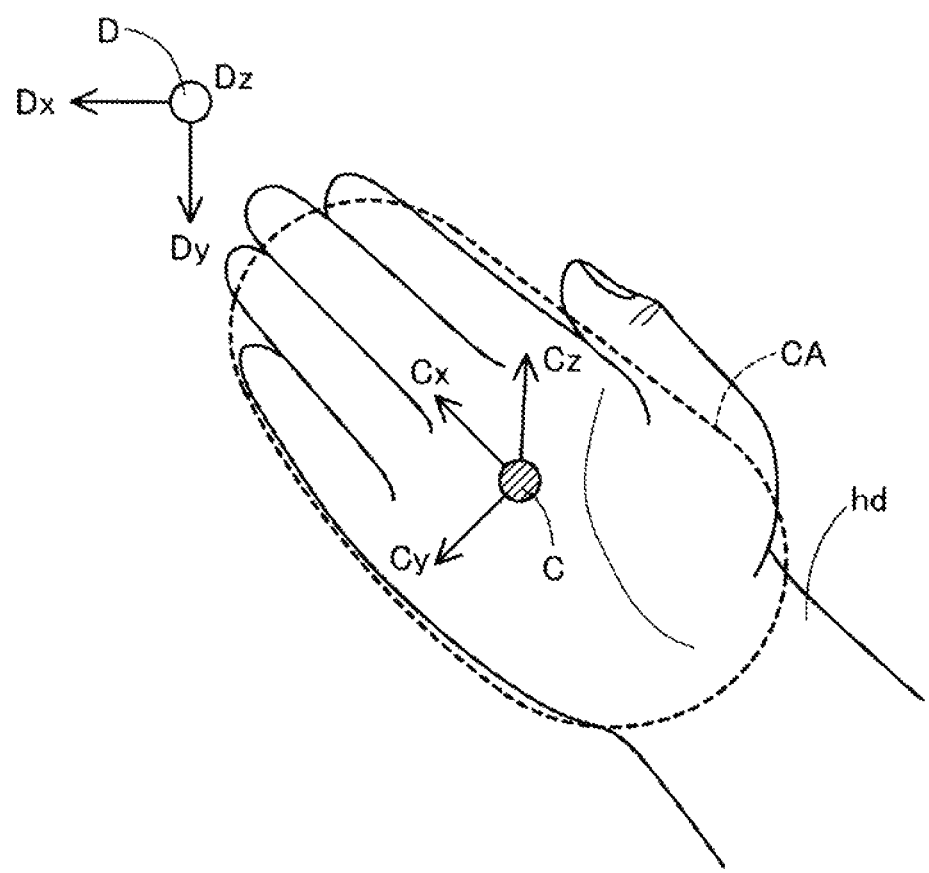
FIG. 10 describes step S110 of the display plane setting process.
Figure 10:
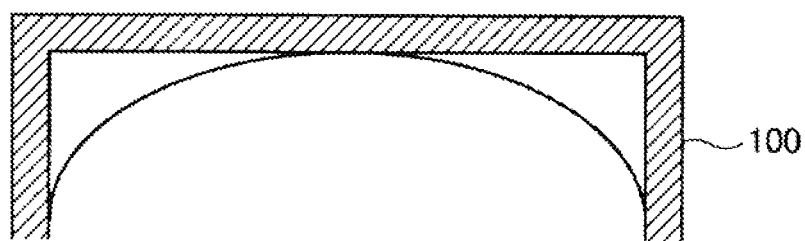

FIG. 10 describes step S110 of the display plane setting process. In the case where the object under evaluation in FIG. 8 has the reference plane CA (YES in step S108), the display plane setting section 152 determines a change parameter representing a change in the position of the center of gravity and the plane inclinations of the reference plane CA from those of the default display plane (FIG. 7) in step S110. The position of the center of gravity of the reference plane CA is the position of the center of gravity C of the reference plane CA within the user's visual field (black circle in FIG. 10). The plane inclinations of the reference plane CA are inclinations Cx, Cy, and Cz within the user's visual field (arrows extending from black circle in FIG. 10). In step S110, the display plane setting section 152 therefore determines:

the amount of change from the position of the center of gravity D of the default display plane to the position of the center of gravity C of the reference plane CA, the amount of change from the inclination Dx of the default display plane to the inclination Cx of the reference plane CA, the amount of change from the inclination Dy of the default display plane to the inclination Cy of the reference plane CA, and the amount of change from the inclination Dz of the default display plane to the inclination Cz of the reference plane CA, within the user's visual field, and the set of the above values is used to form the change parameter.

In step S112 in FIG. 8, the display plane setting section 152 sets a virtual object display plane on the basis of the determined change parameter. Specifically, the display plane setting section 152 stores the change parameter determined in step S110 (amount of change in position of center of gravity, amounts of change in inclinations x, y, and z) in the change parameter 128 (FIG. 6). In a case where a value different from the initial value (zero) is stored in the change parameter 128, the augmented reality processing section 151 produces, in the procedure a2 of the augmented reality process described above, image data for displaying the virtual object determined in the procedure a1 on the display plane specified by correcting the default display plane setting 126 (position of center of gravity D, plane inclinations Dx, Dy, and Dz) by using the change parameter 128 (amount of change in position of center of gravity, amounts of change in inclinations x, y, and z).

Figure 11:
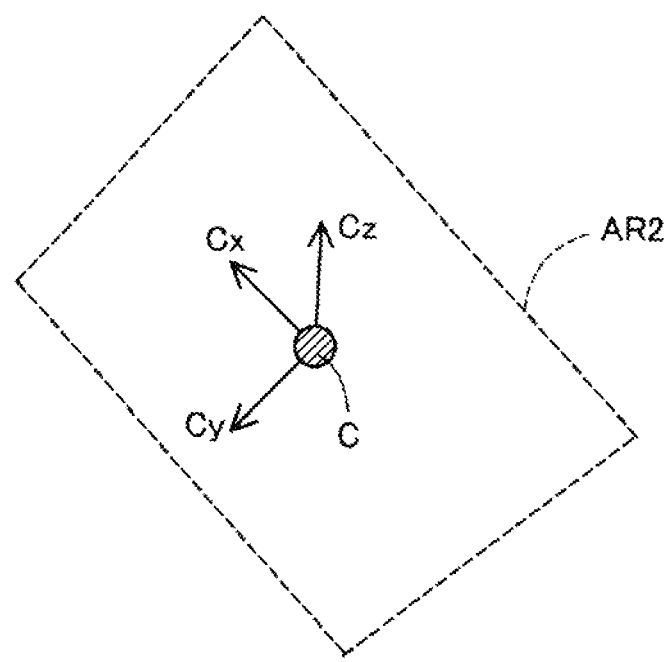
FIG. 11 describes a display plane after correction.
Figure 11:
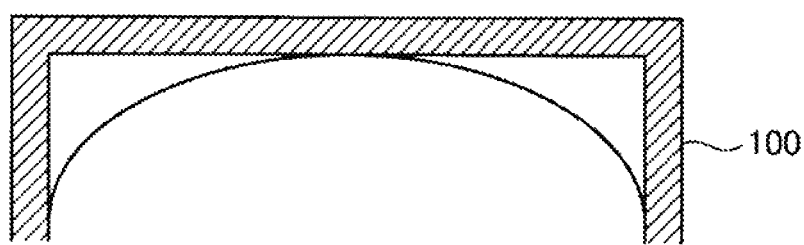

FIG. 11 describes a display plane after the correction. As a result of the execution of the augmented reality process (procedures a1 to a3) using the change parameters 128, the user on whom the HMD 100 is mounted can visually recognize the virtual object (such as figure, symbol, letter, and image) determined in the procedure a1 in a region AR2 (broken rectangle in FIG. 11) having a center of gravity that coincides with the center of gravity C of the reference plane CA and inclinations equal to the inclinations Cx, Cy, and Cz of the reference plane CA.

The example described above has been described with reference to the display plane in which only a single virtual object is displayed, but the display plane setting section 152 can set display planes in which a plurality of virtual objects are displayed by using the same method described above. The display planes in which a plurality of virtual objects are displayed may include a display plane for a guide plane that guides a work procedure, a work content, or other pieces of information that the user should follow, a display plane for an operation plane used by the user to operate the HMD 100, and display planes of different natures. Further, the display planes in which a plurality of virtual objects are displayed may include display planes of the same nature.

As described above, according to the present embodiment, the display plane setting section 152 of the control section 150 changes the position and inclinations of a virtual object visually recognized by the user on the basis of the position C and the inclinations Cx, Cy, and Cz of the reference plane CA present in the real space (step S112 in FIG. 8). The user can therefore adjust the position C and the inclinations Cx, Cy, and Cz of the reference plane CA (changes position and inclinations of hand, for example) in the display plane setting mode to adjust the position and inclinations of a virtual object visually recognized as a virtual image, in other words, the position and inclinations of the virtual object display plane AR2 as intended.

Further, according to the present embodiment, the position and inclinations of a virtual object visually recognized as a virtual image by the user (position and inclinations of virtual object display plane AR2) are equal to the position C and the inclinations Cx, Cy, and Cz of the reference plane CA present in the real space (step S112 in FIG. 8). The user can therefore intuitively adjust the position and inclinations of the virtual object. The case of "being equal to the position C and the inclinations Cx, Cy, and Cz of the reference plane CA" is not limited to the case of complete equality and includes the case of slight deviation to the extent that the user can intuitively adjust the position and inclinations of a virtual object. For example, the position may deviate by a value greater than 0 cm but smaller than or equal to 5 cm, and each of the inclinations may deviate by a value greater than 0° but smaller than or equal to 5°.

Moreover, according to the present embodiment, the acquisition section (camera 61) only acquires information on the real space corresponding to the direction of the user's sight line LS (3D data, color image data) (step S104). In other words, the acquisition section omits acquisition of information on a real space that does not correspond to the direction of the user's sight line LS. The amount of information on the real space acquired by the acquisition section can therefore be reduced. As a result, the processing burden in the analysis performed by the display plane setting section 152 of the control section 150 (steps S108 and S110) can be reduced.

A-3. Additional Process:

In the display plane setting process, the display plane setting section 152 may additionally carry out processes c1 and c2, which will be presented below by way of example. The processes c1 and c2 may be added separately or in combination.

Figure 12:
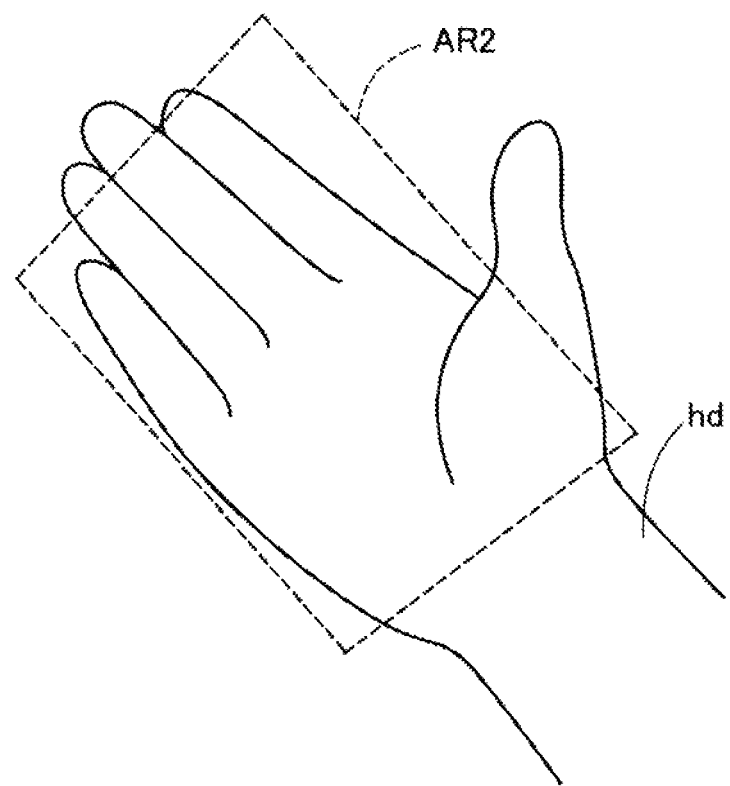
FIG. 12 describes how to change the virtual object display plane again.
Figure 12:
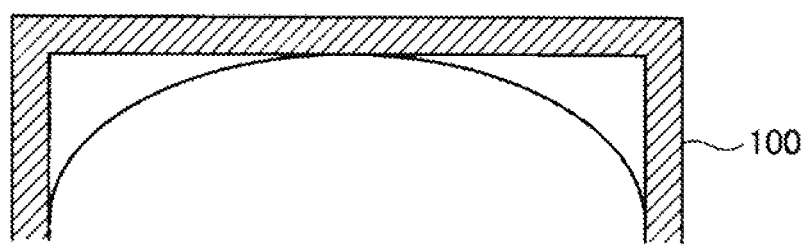

(c1) Change Virtual Object Display Plane Again:

FIG. 12 describes how to change the virtual object display plane again. After the display plane setting process described with reference to FIG. 8 is completed, the display plane setting section 152 may carry out the display plane setting process again in response to detection of the user's first action to change the position and inclinations of the virtual object display plane again on the basis of the position and inclinations of a newly determined reference plane. The first action can be arbitrarily specified in advance. Examples of the first action may include action of achieving a predetermined shape of the hand hd (standing-thumb shape in the example in FIG. 12), as shown in FIG. 12, action of achieving a predetermined shape of the fingers, action of changing the orientation of the hand hd or upside-down action of the hand hd, a predetermined gesture, and a predetermined content speech (voice command). The display plane setting section 152 may carry out the display plane setting process again only in a case where the first action is detected in the vicinity of the virtual object display plane AR2 set in the preceding display plane setting process.

To the change the display plane again, the display plane setting section 152 may overwrite the change parameter 128 with a newly determined change parameter or may store a newly determined change parameter along with the time and version thereof in the change parameter 128.

The display plane setting section 152 of the control section 150 thus changes the position and inclinations of a virtual object again (position and inclinations of virtual object display plane AR2) in response to the first action, whereby the convenience to the user can be improved.

Figure 13:
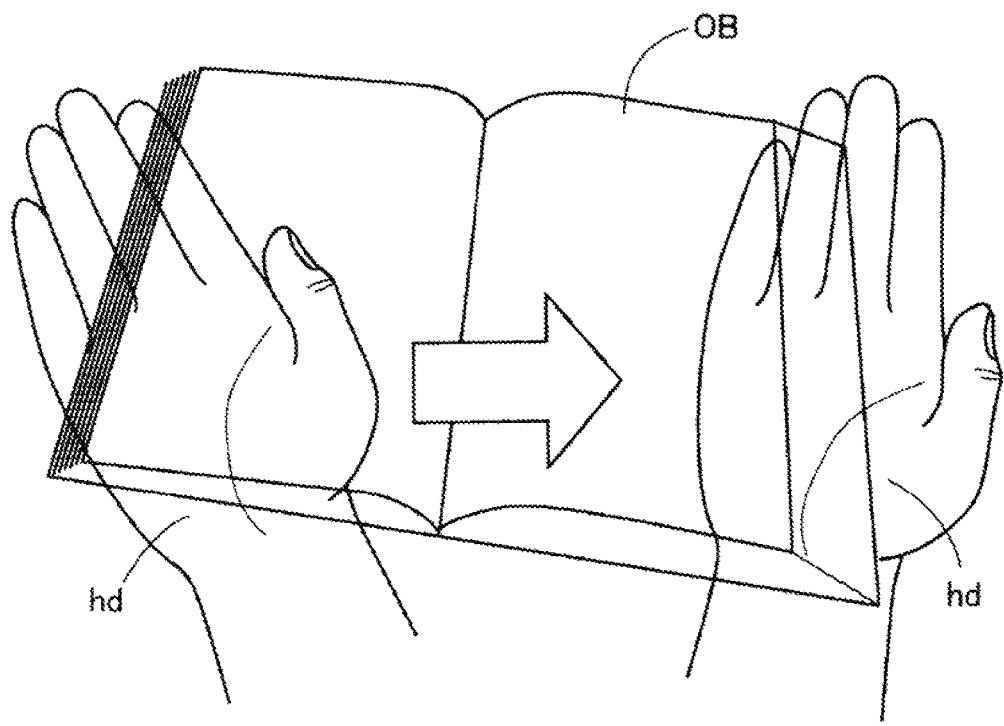
FIG. 13 describes how to change a virtual object display plane again.
Figure 14:
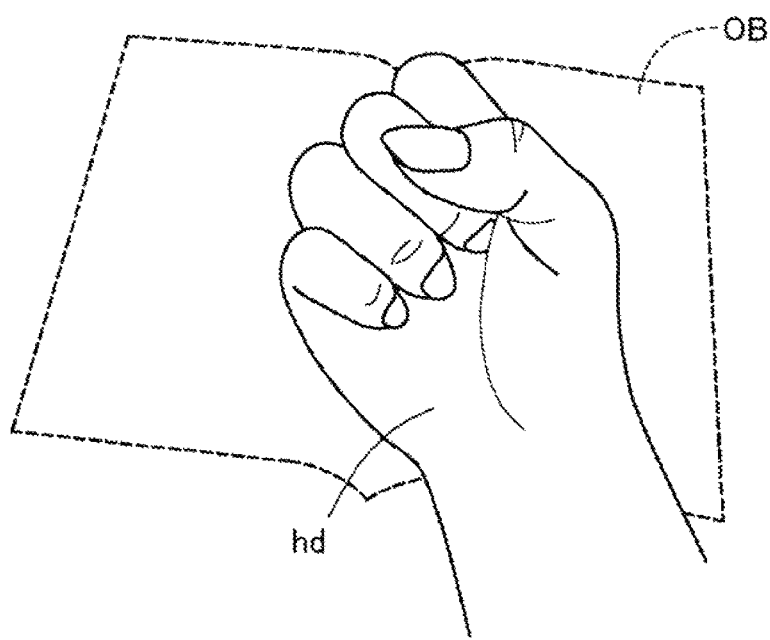
FIG. 14 describes how to change the virtual object display aspect.

(c2) Change Virtual Object Display Aspect:

FIGS. 13 and 14 describe how to change the virtual object display aspect. After the display plane setting process described with reference to FIG. 8 is completed, the augmented reality processing section 151 may change a virtual object display aspect in response to detection of the user's second action. The display aspect is, for example, whether or not a virtual object is displayed, the size of the virtual object, the color of the virtual object, the transmittance of the virtual object, the brightness of the virtual object, and the content of the virtual object. The second action can be arbitrarily specified in advance and can, for example, be action of achieving a predetermined shape of the hand hd, action of achieving a predetermined shape of the fingers, action of changing the orientation of the hand hd or upside-down action of the hand hd, a predetermined gesture, and a predetermined content speech (voice command). For example, in the example shown in FIG. 13, page turning action performed by the hand hd changes the content of a virtual object OB (specifically, displayed page). For example, in the example shown in FIG. 14, first forming action performed by the hand hd changes the state of the virtual object OB to be a non-displayed state. The second action preferably differs from the first action. For example, the second action may be action accompanied by movement of the hand hd in the real space, and the first action may be action accompanied by no movement of the hand hd in the real space but accompanied by a change in the shape of the hand hd. The augmented reality processing section 151 can thus readily detect either the first action or the second action.

Figure 15:
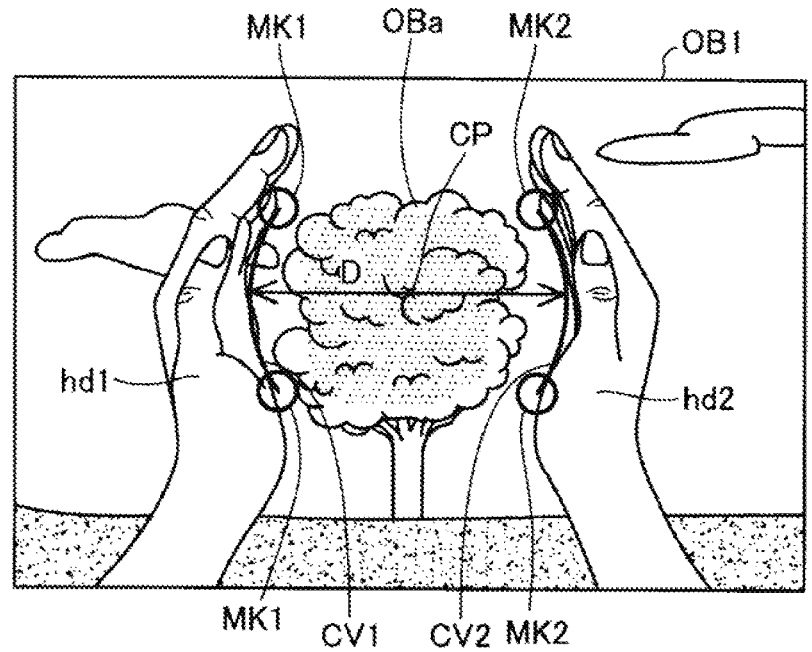
FIG. 15 describes a first specific example of a second action.
Figure 16:
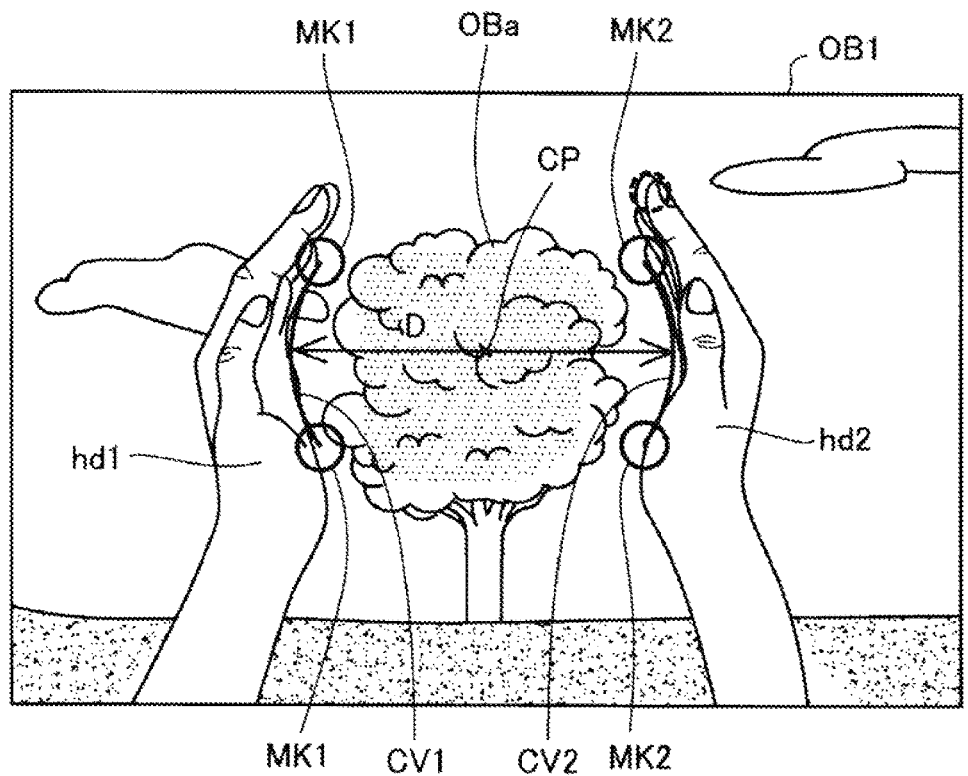
FIG. 16 describes the first specific example of the second action.

Further, specific examples of the second action will be described. FIG. 15 is a first view for describing a first specific example of the second action. FIG. 16 is a second view for describing the first specific example of the second action. In FIGS. 15 and 16, a virtual object OB1 (scenic image, for example) formed by the image display section 20 is enlarged or reduced in accordance with movement of the user's left hand hd1 and right hand hd2. Specifically, the augmented reality processing section 151 (FIG. 6) detects, on the basis of data acquired with the camera 61 (captured image data or 3D data, for example), an inner surface CV1 of the left hand hd1 and an inner surface CV2 of the right hand hd2 so positioned as to overlap with the virtual object OB1. In a case where each of the detected inner surfaces CV1 and CV2 is a curved surface having curvature greater than or equal to a predetermined threshold, the augmented reality processing section 151 sets an initial value of enlargement or reduction of the virtual object OB1. The predetermined threshold is preferably set, for example, at a value large enough for the user to identify an intentionally bent left hand hd1 and right hand hd2 in order to allow the augmented reality processing section 151 to perform the second action. To allow the user to readily recognize whether or not on the basis of which portion of the inner surfaces CV1 and CV2 the augmented reality processing section 151 has detected the inner surfaces CV1 and CV2, sensing markers MK1 and MK2 may be displayed at the portions on the basis of which the detection has been made. In the present specific example, the sensing markers MK1 are displayed at opposite ends of the portion of the left hand hd1 on the basis of which the detection has been made, and the sensing markers MK2 are displayed at opposite ends of the portion of the right hand hd2 on the basis of which the detection has been made.

In the initial setting, the augmented reality processing section 151 calculates the distance D between the detected two inner surfaces CV1 and CV2 and the center point CP of the distance D and stores the calculated values in the storage section 122 (FIG. 6). The augmented reality processing section 151 then reduces or enlarges the virtual object OB1 with respect to the center point CP in accordance with a change in the distance D between the two inner surfaces CV1 and CV2 from the distance D in the initial setting. Specifically, the augmented reality processing section 151 increases the size of the virtual object OB1 as the distance D increases from the value in the initial setting (FIG. 16), whereas decreasing the size of the virtual object OB1 as the distance D decreases from the value in the initial setting. In the examples shown in FIGS. 15 and 16, the virtual object OB1 is enlarged or reduced with respect to a virtual object OBa representing a tree, which is part of the virtual object OB1.

Figure 17:
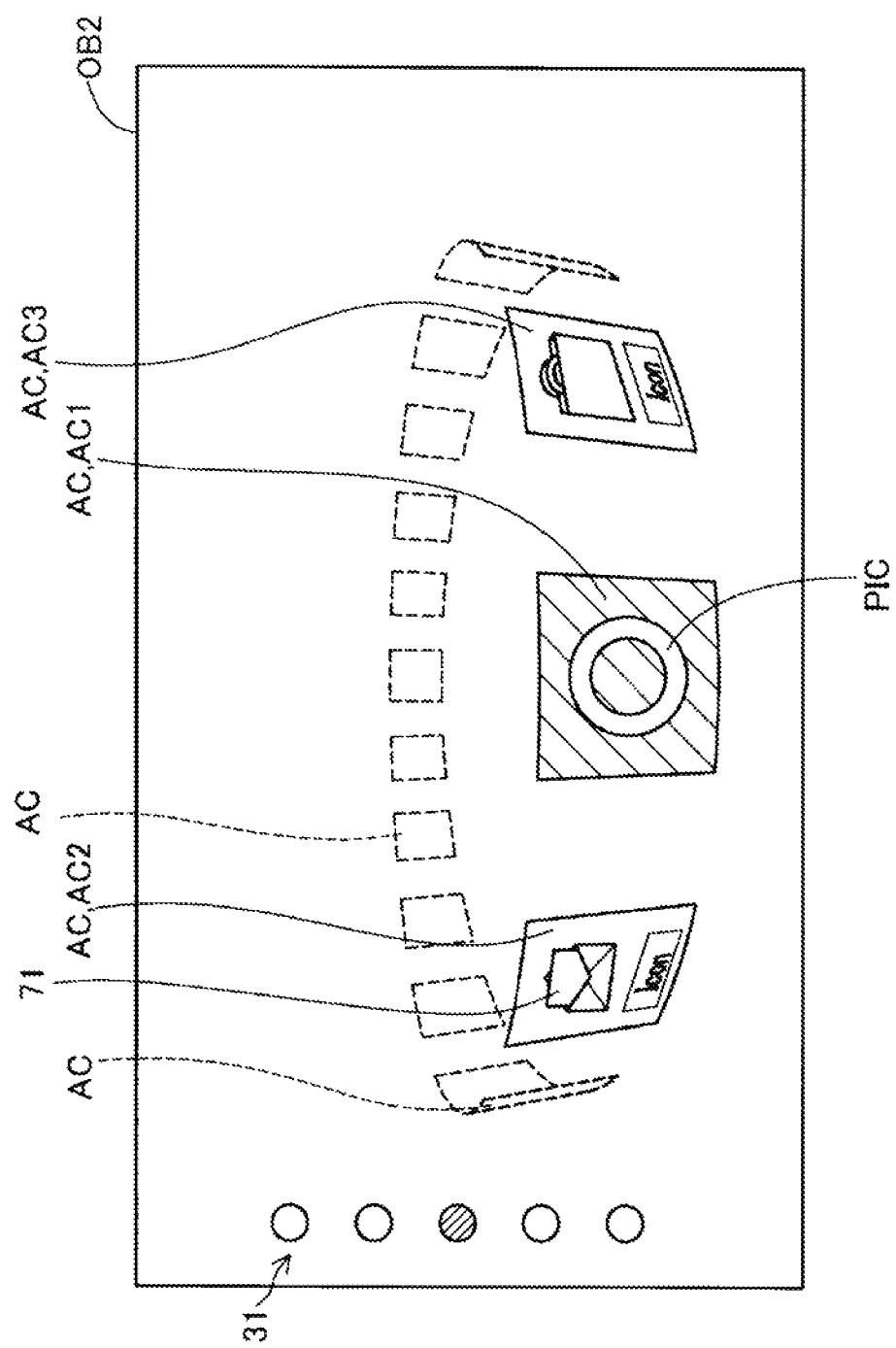
FIG. 17 describes a second specific example of the second action.
Figure 18:
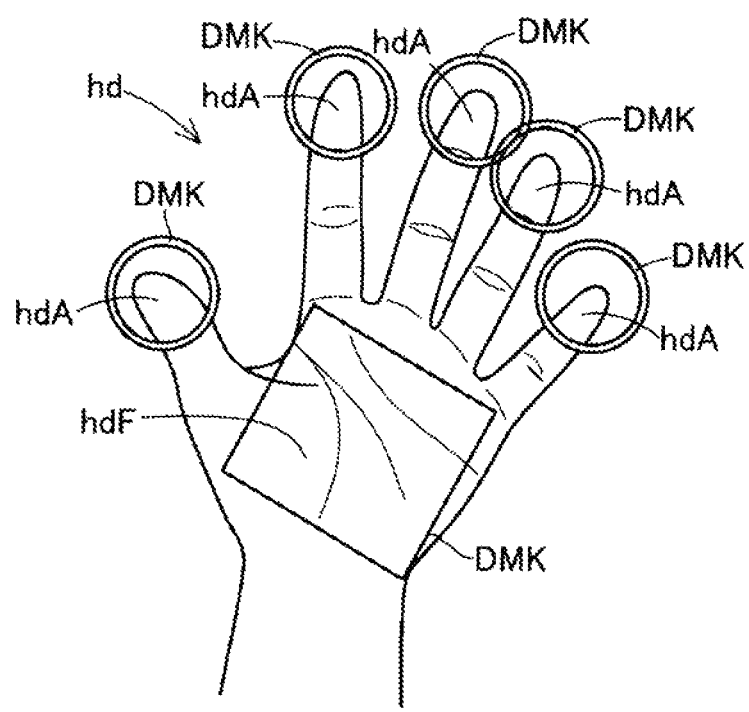
FIG. 18 shows a hand used in the second specific example.

FIG. 17 describes a second specific example of the second action. FIG. 18 shows the hand hd used in the second specific example. FIG. 17 shows a virtual object OB2, which is an arranged icon image formed by the image display section 20. The virtual object OB2 contains a plurality of icon selection images AC. The plurality of icon selection images AC are arranged in a circular shape. In the virtual object OB2, three icon selection images AC1, AC2, and AC3 are so arranged as candidates to be identified on the side facing the reader. When one of five display indicators 31 vertically arranged in the virtual object OB2 is selected, the plurality of icon selection images AC arranged in a circular shape are rotated so that the icon selection images AC located on the side facing the reader are switched to others. The selection of one of the display indictor 31 may be performed by using the cross key 13 or the trackpad 14 (FIG. 1) or may be performed by the second action, which will be described later.

The virtual object OB2 contains a selection pointer PIC used when the user selects one of the display indicators 31 and one of the icon selection images AC. The selection pointer PIC has a ring-like shape. The selection pointer PIC may be moved in response to operation performed on the cross key 13 or the trackpad 14 or may be moved in accordance with the direction of the user's sight line estimated by the augmented reality processing section 151. The direction of the user's sight line is determined by analysis of an image of the right eye and an image of the left eye captured with the inside camera 62 and acquisition of the orientation of the irises of the eyes, as in the case where the display plane setting section 152 described above determines the direction of the user's sight line.

The augmented reality processing section 151, when it detects the second action, changes the display aspect of the virtual object OB2. The second action is, for example, a change in the user's gesture (change in shape of hand hd) or action of changing the orientation of the hand hd or upside-down action of the hand hd. An example in which the display aspect of the virtual object OB2 is changed in accordance with a change in the user's gesture (change in shape of hand hd) will be described below.

The storage section 122 (FIG. 6) stores relation table data in which the content of a change in the gesture is related to a display aspect of the virtual object OB2, and the augmented reality processing section 151 changes the display aspect of the virtual object OB2 on the basis of the relation table data. Specifically, when the change from the state in which the user's hand hd is open (paper state in scissors-paper-rock game) to the state in which the user's hand hd is closed (rock state) is detected, the augmented reality processing section 151 stops displaying the virtual object OB2 (state of virtual object OB2 is changed to non-display state). When the change from the state in which the user's hand hd is open (paper state) to the state in which the user's two fingers are raised (scissors state) is detected, the augmented reality processing section 151 selects the icon selection image AC located on the selection pointer and displays a virtual object corresponding to the selected icon selection image AC. The state of the hand hd (gesture) can be detected, for example, by extraction of the contour of the hand hd from the data on an image captured with the camera 61 and pattern matching between the extracted contour and contours stored in the storage section 122 in advance. Instead, for example, a fingertip ball surface hdA may be detected by using pattern matching or any other technology, and the state of the hand hd (gesture) may then be identified in accordance with the number of detected finger ball surfaces hdA. For example, when the number of detected finger ball surfaces hdA is two, the state of the hand hd may be identified to be the scissors state, when the number of detected finger ball surfaces hdA is five, the state of the hand hd may be identified to be the paper state, and when the number of detected finger ball surfaces hdA is zero, the state of the hand hd may be identified to be the rock state. Still instead, the palm hdF may be detected by using pattern matching or any other technology, and the state of the hand hd (gesture) may be identified in accordance with the area of the detected palm hdF. When the area of the detected palm hdF is greater than or equal to a predetermined first value, the state of the hand hd may be identified to be the paper state, when the area of the detected palm hdF is greater than or equal to a predetermined second value but smaller than the first value, the state of the hand hd may be identified to be the scissors state, and when the area of the detected palm hdF is smaller than the second value, the state of the hand hd may be identified to be the rock state.

As shown in FIG. 18, when the state of the hand hd is detected, a sensing marker DMK, which allows the user to recognize that the portion with the sensing marker DMK is the portion on the basis of which the detection has been made, may be displayed at the fingertip ball surface hdA or the palm hdF detected by the augmented reality processing section 151.

Figure 19:
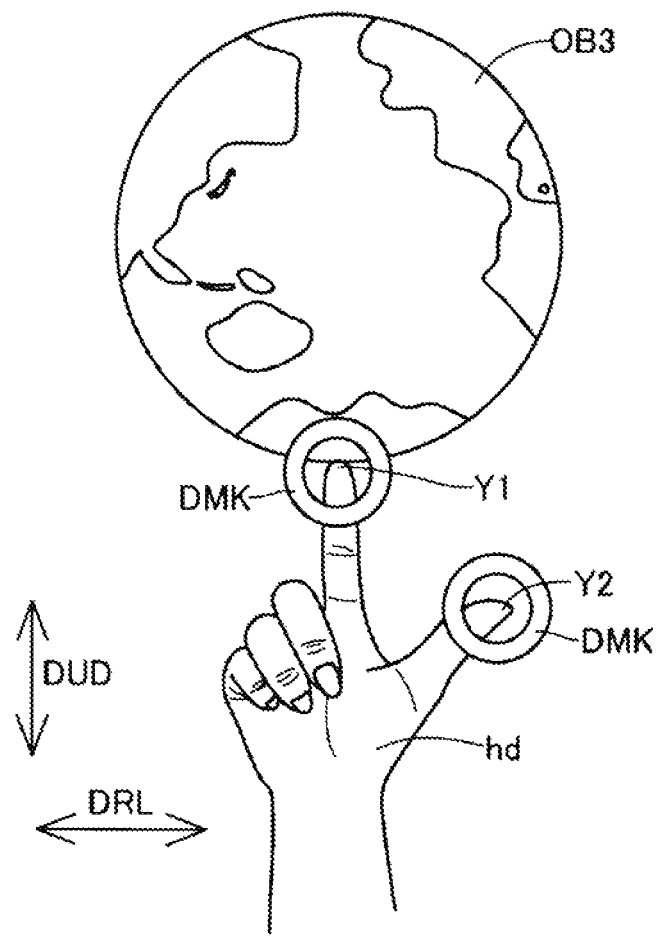
FIG. 19 is a first view for describing a third specific example of the second action.
Figure 20:
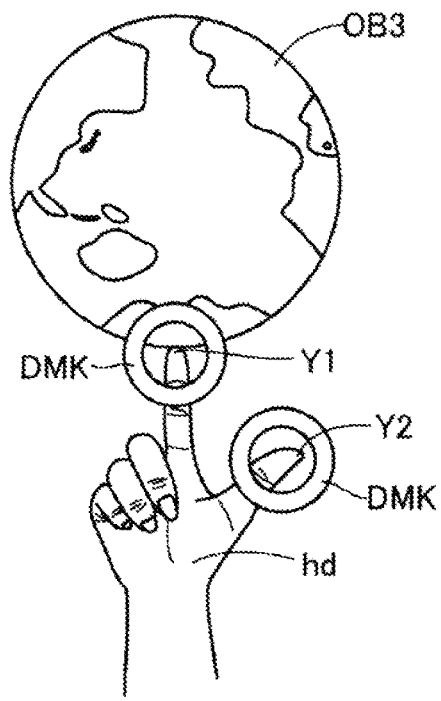
FIG. 20 is a second view for describing the third specific example of the second action.

FIG. 19 is a first view for describing a third specific example of the second action. FIG. 20 is a second view for describing the third specific example of the second action. A virtual object OB3 is an image showing the earth. The augmented reality processing section 151 detects fingertips Y1 and Y2 of the user's hand hd by using pattern matching or any other technology and evaluates whether or not at least one of the detected fingertips Y1 and Y2 is so located as to be in contact with the lower side of the virtual object OB3. In the case where at least one of the detected fingertips Y1 and Y2 is so located as to be in contact with the lower side of the virtual object OB3, the augmented reality processing section 151 detects movement of the hand hd (fingertip Y1 in detail) in the real space as the second action and changes the display aspect of the virtual object OB3 in accordance with the movement of the hand hd. Specifically, in a case where the fingertip Y1 so located as to be in contact with the virtual object OB3 is moved in the real space in the upward/downward direction DUD or the rightward/leftward direction DRL, the virtual object OB3 is also moved in correspondence with the movement of the fingertip Y1. In a case where the fingertip Y1 is moved in the depth direction, the virtual object OB3 is reduced or enlarged in accordance with the movement of the fingertip Y1. For example, in a case where the hand hd is moved toward the side facing away from the reader from the state shown in FIG. 19 to the state shown in FIG. 20, the augmented reality processing section 151 decreases the size of the virtual object OB3. On the other hand, in a case where the hand hd is moved toward the side facing the reader, the augmented reality processing section 151 increases the size of the virtual object OB3. The movement of the hand hd in the depth direction may be detected on the basis of data acquired from the camera 61. Instead, an image of the user's right eye and an image of the user's left eye captured with the inside camera 62 may be analyzed to detect the angle of parallax between the right and left eyes, and the movement of the hand hd in the depth direction may then be detected on the basis of a change in the angle of parallax. For example, the augmented reality processing section 151 may determine that the hand hd is moved toward the side facing away from the reader as the angle of parallax decreases.

Figure 21:
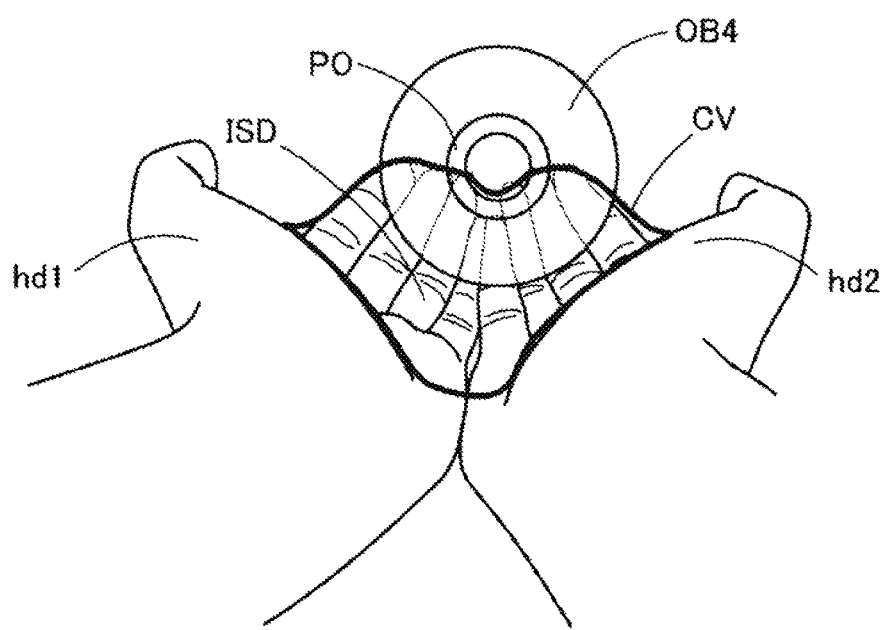
FIG. 21 describes a fourth specific example of the second action.

FIG. 21 describes a fourth specific example of the second action. FIG. 21 shows that a virtual object OB4 is a sphere and the virtual object OB4 is so formed that the sphere floats in an upper portion of an inner section ISD inside the user's hands hd1 and hd2. The augmented reality processing section 151 detects a curved surface CV of the inner section ISD inside the hands hd1 and hd2 on the basis of data acquired with the camera 61 (captured image data and 3D data, for example). The user moves, as the second action, the hands hd1 and hd2 in the state shown in FIG. 21 in the upward/downward direction and the rightward/leftward direction. The detected curved surface CV also moves in accordance with the movement of the hands hd1 and hd2. The augmented reality processing section 151 moves the position of the virtual object OB4 in correspondence with the movement of the curved surface CV in the upward/downward direction and the rightward/leftward direction. As an example of the second action, the state of the virtual object OB4 may be changed to a non-displayed state in response to action of changing the state of the hands hd1 and hd2 shown in FIG. 21 to the state in which the hands hd1 and hd2 are put together.

The distance between the virtual object OB4 and the hands hd1, hd2 (floating degree of virtual object OB4) may be changed in accordance with how intensely the user gazes at the virtual object OB4. For example, an image of the right eye and an image of the left eye acquired from the inside camera 62 are analyzed, and the intensity of the gaze is determined on the basis of the size of the openings of the irises. The augmented reality processing section 151 determines that the user gazes at the virtual object OB4 more intensely as the irises open by a greater amount. A pointer PO may be displayed in the direction of the user's sight line.

By moving the direction of the sight line as the second action, the virtual object OB4 along with the pointer PO may be moved in accordance with the movement of the sight line.

Figure 22:
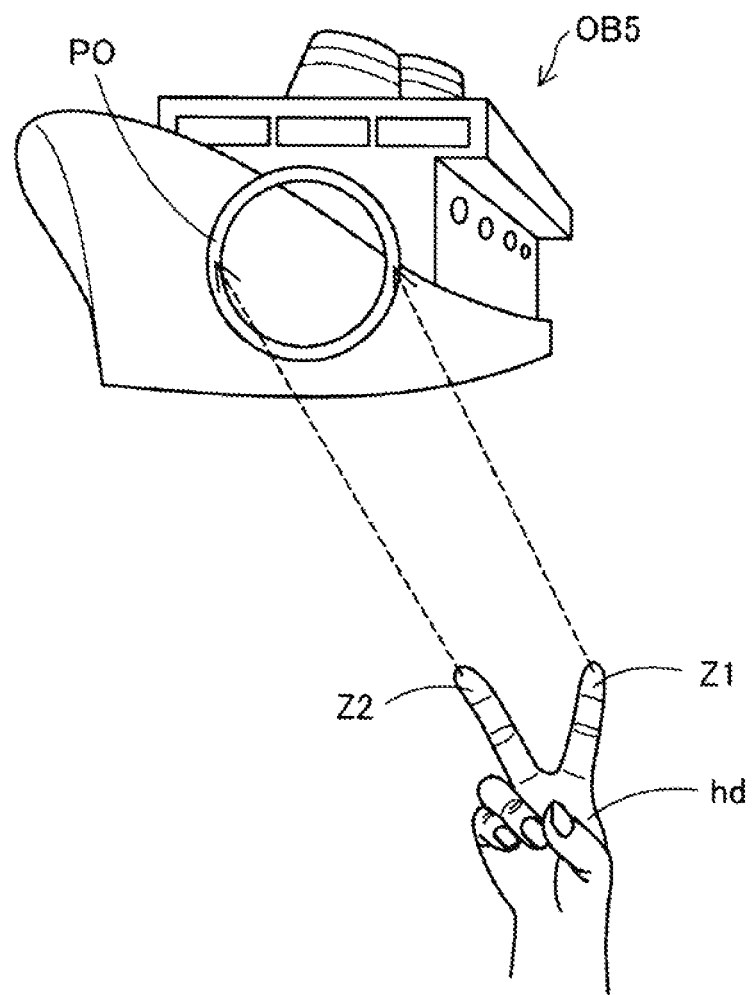
FIG. 22 is a first view for describing a fifth specific example of the second action.
Figure 23:
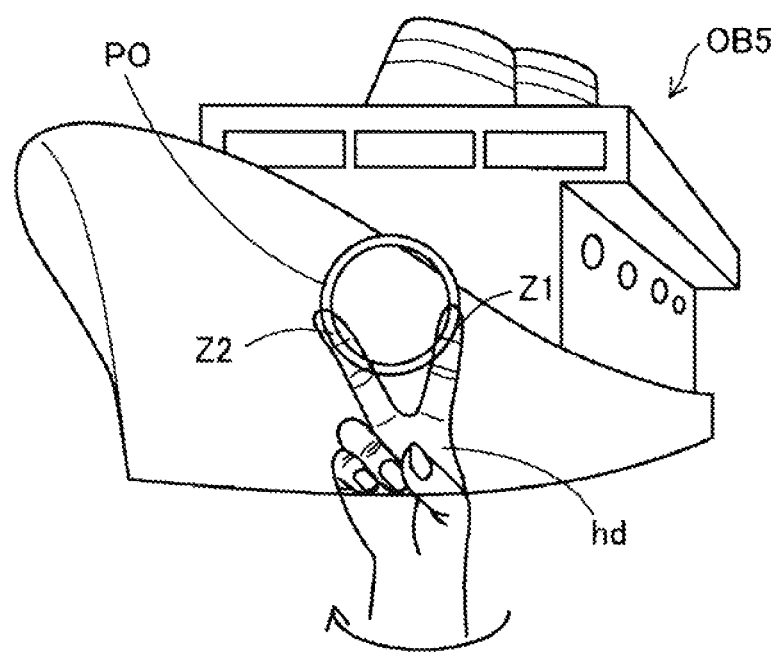
FIG. 23 is a second view for describing the fifth specific example of the second action.

FIG. 22 is a first view for describing a fifth specific example of the second action. FIG. 23 is a second view for describing the fifth specific example of the second action. The fifth specific example is an example in which the display aspect of a virtual object OB5 is changed in accordance with movement of finger ball surfaces Z1 and Z2 of the user's two fingers (index finger and middle finger in the present example) as the second action. In the present specific example, the virtual object OB5 is an image of a ship. The user first moves the two finger ball surfaces 21 and Z2 to a displayed ring-shaped pointer PO so displayed as to overlap with the virtual object OB5. The augmented reality processing section 151 detects the two finger fall surfaces Z1 and Z2 by using pattern matching or any other technology on the basis of data acquired with the camera 61 (captured image data or 3D data) and determines whether the detected two finger ball surfaces Z1 and Z2 are located on the pointer PO. In the case where the two finger ball surfaces Z1 and Z2 are located on the pointer PO, the display aspect of the virtual object OB5 is changed in accordance with the movement of the two finger ball surfaces Z1 and Z2 in the real space. For example, in a case where the positional relationship between the two finger ball surfaces Z1 and Z2 is changed by rotation of the hand hd, the size of the virtual object OB may be increased, as shown in FIG. 23. Further, the size of the virtual object OB5 may be decreased as the distance between the two finger ball surfaces Z1 and Z2 decreases. In another aspect, in a case where the positional relationship between the two finger ball surfaces Z1 and Z2 is changed by rotation of the hand hd, the virtual object OB5 may be rotated three-dimensionally in accordance with the degree of the rotation of the hand hd. The display aspect of the pointer PO may be changed in accordance with the change in the display aspect of the virtual object OB5. For example, the size of the pointer PO may be changed in accordance with the size of the virtual object OB5, and the pointer PO may be rotated in accordance with the rotation of the virtual object OB5.

In the first to fifth specific examples of the second action described above, in the case where the display aspects of the virtual objects OB1 to OB5 are changed, to allow the user to readily visually recognize the virtual objects OB1 to OB5, the augmented reality processing section 151 may adjust the luminance of the virtual objects OB1 to OB5, perform gamma correction thereon, adjust the contrast thereof, or enhance the edges thereof. Further, in the case where the pointer PO is displayed, the variety of above-mentioned types of processing (luminance adjustment, for example) performed on the virtual objects OB1 to OB5 may be performed on the pointer PO. Moreover, numerals representing the degrees of luminance, contrast, and other factors of the virtual objects OB1 to OB5 and the pointer PO may be displayed in the form of virtual images showing indicators. The control section 150 may have a reset function of causing changed luminance and contrast values to return to initial values.

In the first to fifth specific examples of the second action described above, the second actions and changes in the display aspect of the virtual objects OB1 to OB5 may be set on a user basis and saved in the storage section 122. The selection pointer PIC (FIG. 17) and the pointer PO (FIGS. 21 and 22) do not necessarily have a ring shape and may have any of a variety of other shapes. For example, the selection pointer PIC and the pointer PO may have a polygonal shape, a circular shape, or an elliptical shape.

As described above, the augmented reality processing section 151 of the control section 150 changes the virtual object display aspect in response to the second action, whereby the convenience to the user can be improved. Further, since the second action is movement of the user's hand hd in the real space and a change in the shape of the hand hd, the user can more intuitively change the display aspects of the virtual objects OB1 to OB5.

A-4. Other Control of Virtual Object Based on Reference Plane:

In the above description, the control section 150 determines the position and inclinations of the reference plane CA and changes the position and inclinations of a virtual object OB on the basis of the determined position and inclinations of the reference plane CA. The control section 150 may, however, perform another type of control as long as the virtual object OB is changed on the basis of the reference plane CA. For example, the control section 150 may detect the distance from the HMD 100 to the reference plane CA and change a display distance of the virtual object OB in accordance with the distance having been detected (detected distance). The term "display distance" is not the distance from the image display section 20, which displays the virtual object OB, to the user but refers to a virtual distance to the virtual object OB recognized by the user when the user visually recognize the virtual object OB displayed by the image display section 20. That is, the control section 150 may produce the virtual object OB in such a way that a display convergence angle, which is the angle formed by the right eye RE and the left eye LE viewed from the virtual object OB displayed by the image display section 20, is changed in accordance with the detected distance. A specific example of the above situation will be described below.

Figure 24:
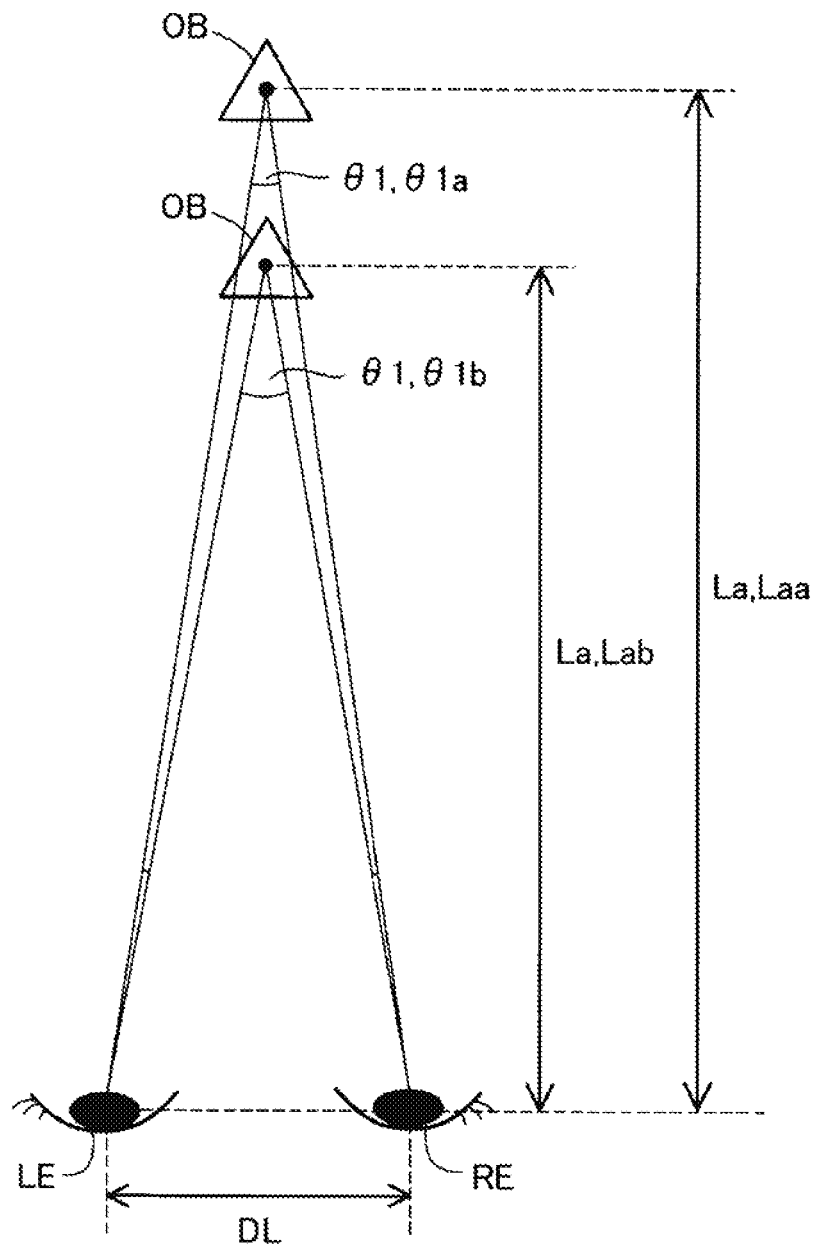
FIG. 24 diagrammatically shows the relationship between a display distance and a display convergence angle.

FIG. 24 diagrammatically shows the relationship between a display distance La and a display convergence angle $\theta1$. The distance between the center of the right light guide plate 26 and the center of the left light guide plate 28 is considered as an interpupillary distance DL between the user's right eye RE and left eye LE. The interpupillary distance DL stored in the storage section 122 is therefore a value based on a design value in the HMD 100 (65 mm, for example).

When the display convergence angle $\theta1$ of the user who visually recognizes the virtual object OB is an angle $\theta1a$, the display distance La is a distance Laa, and When the display convergence angle $\theta1$ is an angle $\theta1b$ greater than the angle $\theta1a$, the display distance La is a distance Lab shorter than the distance Laa, as shown in FIG. 24.

Figure 25:
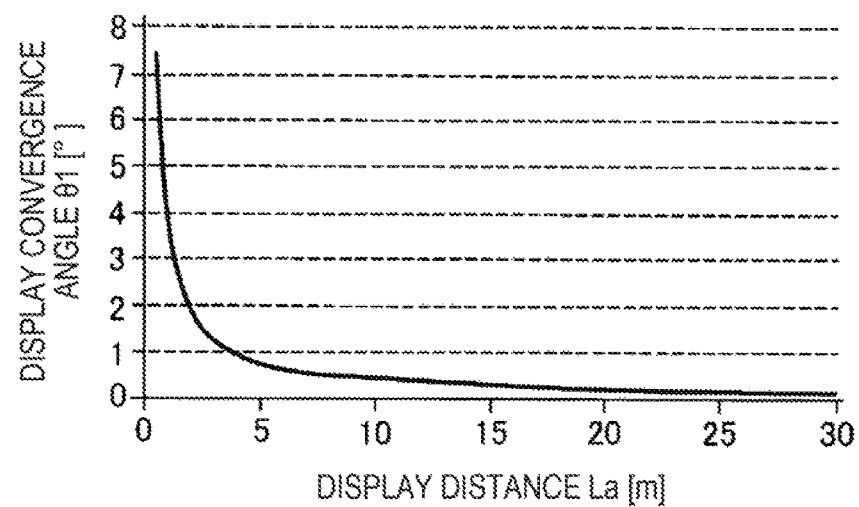
FIG. 25 shows the relationship between the display convergence angle and the display distance.
Figure 26:
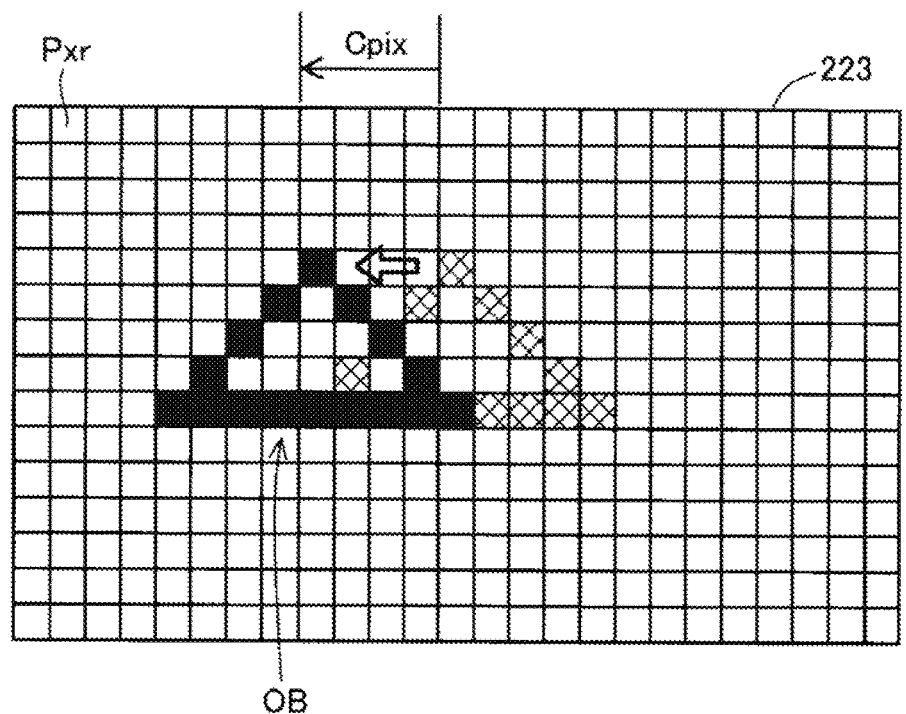
FIG. 26 diagrammatically shows a plurality of pixels provided in an OLED panel for the right eye.
Figure 27:
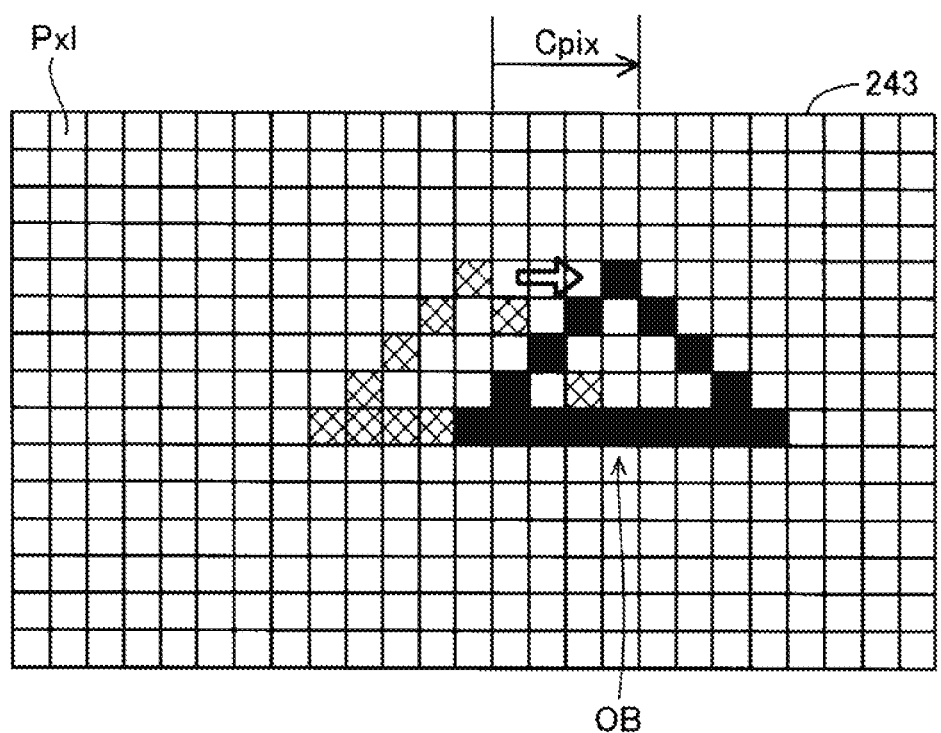
FIG. 27 diagrammatically shows a plurality of pixels provided in an OLED panel for the left eye.

FIG. 25 shows the relationship between the display convergence angle $\theta1$ and the display distance La. FIG. 26 diagrammatically shows a plurality of pixels Pxr provided in the OLED panel 223 for the right eye RE. FIG. 27 diagrammatically shows a plurality of pixels Pxl provided in the OLED panel 243 for the left eye LE. The pixels Pxr are also called pixels Pxr for the right eye, and the pixels Pxl are also called pixels Pxl for the left eye. FIGS. 26 and 27 diagrammatically show the virtual object OB visually recognized by the user. The cross-hatched pixels represent pixels of the virtual object OB displayed at the display distance in the initial setting of the HMD 100 (initial display distance), and the black pixels represent pixels of the virtual object OB after the display distance La is changed. It is noted that part of the cross-hatched pixels is not shown but hidden behind black pixels. The actual number of pixels of each of the OLED panels 223 and 243 is, for example, 966, but the number of pixels in FIGS. 26 and 27 is reduced for ease of understanding.

The greater the display convergence angle θ1, the shorter the display distance La, as shown in FIG. 25. Data representing the relationship between the display convergence angle θ1 and the display distance La shown in FIG. 25 is stored in the storage section 122. In the HMD 100 of the present embodiment, the display convergence angle θ1 in the initial setting is so set that the display distance La is 4 m. In the present embodiment, the display convergence angle θ1 in the initial setting is, for example, 0.15°.

In a case where the display distance La is made shorter than that in the initial setting, the control section 150 changes the positions of the pixels of the virtual object OB in the OLED panels 223 and 243 in such a way that the display convergence angle θ1 increases, as shown in FIGS. 26 and 27. Specifically, the control section 150 shifts the positions of the pixels of the virtual object OB in the OLED panel 223 leftward from the positions in the initial setting. Similarly, the control section 150 shifts the positions of the pixels of the virtual object OB in the OLED panel 243 rightward from the positions in the initial setting. The amount of shift of the pixel positions Cpix and the shift direction (either rightward or leftward) are related to a target display distance La and stored in the storage section 122. In the present embodiment, when the amount of shift Cpix is 24, that is, the positions of the pixels of the virtual object OB are shifted by the amount corresponding to 24 pixels in each of the OLED panels 223 and 243 toward the center (leftward in OLED panel 223 and rightward in OLED panel 243), the display convergence angle θ1 increases by 1°.

The control section 150 acquires information on the distance to the reference plane CA produced by the camera 61. The distance information may, for example, be information on a single distance representative of a plurality of distances. For example, the acquired distance information may be information on the distance to the position of the center of gravity of the reference plane CA. Part of the control section 150 functions as a distance detection section described in the SUMMARY section.

The control section 150 refers to data stored in the storage section 122 and determines the amount of shift from the positions of the pixels of the virtual object OB in the initial setting and the shift direction in such a way that the distance represented by the acquired distance information is the display distance La. The control section 150 then uses the determined amount of shift and shift direction to change the positions of the pixels of the virtual object OB in the initial setting. That is, the control section 150 changes the positions of the pixels of the virtual object OB in each of the OLED panels 223 and 243 in such a way that a reference convergence angle θ2, which is the angle formed by the right eye RE and the left eye LE viewed from the reference plane CA, is equal to the display convergence angle θ1. As a result, the reference convergence angle θ2 can be equal to the display convergence angle θ1, whereby the user can visually recognize both the reference plane CA and the virtual object OB without feeling uncomfortable.

The example described above is not necessarily employed. In another example, the control section 150 only need to change the positions of the pixels of the virtual object OB in the plurality of pixels Pxr for the right eye and the plurality of pixels Pxl for the left eye in accordance with the distance to the detected reference plane CA. For example, the control section 150 may change the positions of the pixels of the virtual object OB in such a way that the display convergence angle θ1 decreases as the reference convergence angle θ2 decreases (that is, distance to reference plane CA increases). As a result, a large difference between the reference convergence angle θ2 and the display convergence angle θ1 can be avoided, whereby the user can visually recognize both the reference plane CA and the virtual object OB without feeling uncomfortable.

Further, in the example described above, the control section 150 may carry out a variety of processes for allowing the user to visually recognize a virtual object OB in a more three-dimensional manner. For example, correction in which the luminance or gamma value is changed and correction in which a virtual object OB is so shaded as to be visually recognized in a more three-dimensional manner may be performed on image data representing the virtual object OB.

B. Variations

In the embodiment described above, part of the configuration achieved by hardware may be replaced with software. Conversely, part of the configuration achieved by software may be replaced with hardware. In addition, the following variations are conceivable.

Variation 1:

In the embodiment described above, the configuration of the HMD is presented by way of example. The configuration of the HMD can, however, be arbitrarily specified to the extent that the specified configuration does not depart from the substance of the invention. For example, addition, omission, conversion, and other manipulation of a component of the HMD can be performed.

In the embodiment described above, what is called a transmissive HMD 100, which allows outside light to pass through the right light guide plate 26 and the left light guide plate 28, has been described. The invention is, however, also applicable, for example, to what is called a non-transmissive HMD 100, which displays an image with no outside scene visually recognized. Further, these HMDs 100 not only allow the AR display described in the above embodiment in which a displayed image is superimposed on the real space but also allow MR (mixed reality) display in which a combination of a captured real space image and a virtual image is displayed or VR (virtual reality) display in which a virtual space is displayed. Further, the invention is also applicable to an apparatus that performs no AR, MR, or VR display.

In the embodiment described above, the control apparatus 10 and the image display section 20, each of which is a functional portion, have been described, and these functional portions can be arbitrarily changed. For example, the following aspects may be employed: an aspect in which the storage section 122 and the control section 150 are incorporated in the control apparatus 10 and the image display section 20 is equipped only with the display function; an aspect in which the storage section 122 and the control section 150 are incorporated in both the control apparatus 10 and the image display section 20; an aspect in which the control apparatus 10 and the image display section 20 are integrated with each other, in this case, for example, the components of the control apparatus 10 are all incorporated in the image display section 20 so that the image display section 20 is configured as a spectacle-shaped wearable computer; an aspect in which the control apparatus 10 is replaced with a smartphone or a portable game console; and an aspect in which the control apparatus 10 and the image display section 20 are connected to each other over wireless communication with no connection cable 40, in this case, for example, electric power may also be wirelessly supplied to the control apparatus 10 and the image display section 20.

Variation 2:

In the embodiment described above, the configuration of the control apparatus is presented by way of example. The configuration of the control apparatus can, however, be arbitrarily specified to the extent that the specified configuration does not depart from the substance of the invention. For example, addition, omission, conversion, and other manipulation of a component of the control apparatus can be performed.

In the embodiment described above, an example of the input section provided as part of the control apparatus 10 has been described. The control apparatus 10 may instead be so configured that part of the input section presented by way of example is omitted or may include an input section different from the input section described above. For example, the control apparatus 10 may include an operation stick, a keyboard, a mouse, or any other component. For example, the control apparatus 10 may include an input section that interprets a command related to the user's body motion or any other motion. Detection of the user's body motion or any other motion can, for example, be sight line detection in which the sight line is detected and gesture detection in which hand motion is detected, or the user's body motion or any other motion can be acquired, for example, with a foot switch that detects foot motion. The sight line detection can, for example, be achieved with a camera that captures an image of the interior of the image display section 20. The gesture detection can, for example, be achieved by analysis of images captured with the camera 61 over time.

In the embodiment described above, the control section 150 operates when the main processor 140 executes the computer program in the storage section 122. The control section 150 can instead be configured in a variety of other ways. For example, the computer program may be stored, in place of the storage section 122 or in addition of the storage section 122, in the nonvolatile storage section 121, the EEPROM 215, the memory 118, and other external storage devices (including a USB memory and other storage devices inserted into a variety of interfaces and a server and other external apparatus connected via a network). The functions of the control section 150 may be achieved by using an ASIC (application specific integrated circuit) designed for achieving the functions.

Variation 3:

In the embodiment described above, the configuration of the image display section has been presented by way of example. The configuration of the image display section can, however, be arbitrarily specified to the extent that the specified configuration does not depart from the substance of the invention. For example, addition, omission, conversion, and other manipulation of a component of the image display section can be performed.

Figure 28:
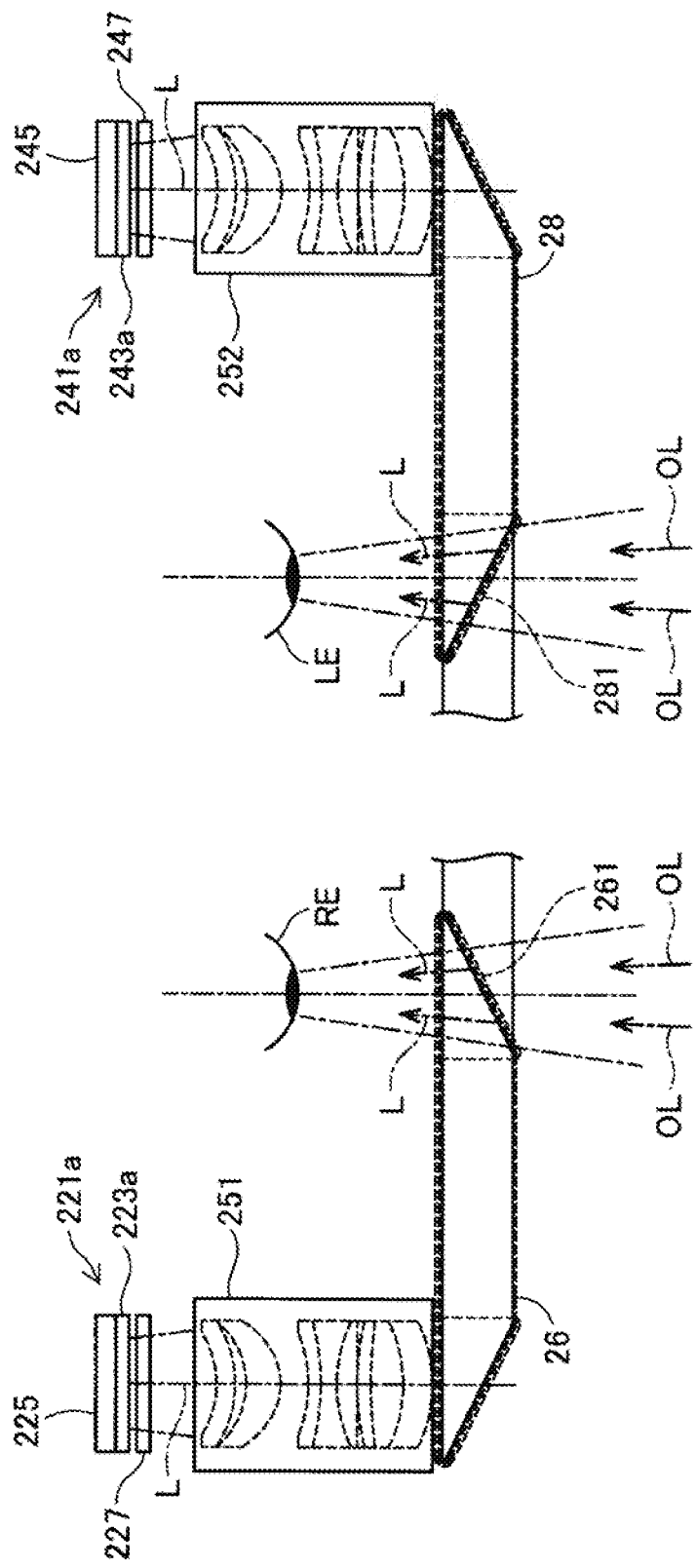
FIG. 28 is a key part plan view showing the configuration of an optical system provided in an image display section according to a variation.

FIG. 28 is a key part plan view showing the configuration of an optical system provided in an image display section according to a variation. The image display section according to the variation is provided with an OLED unit 221a corresponding to the user's right eye RE and an OLED unit 241a corresponding to the user's left eye LE. The OLED unit 221a corresponding to the right eye RE includes an OLED panel 223a, which emits white light, and the OLED drive circuit 225, which drives the OLED panel 223a to cause it to emit the light. A modulation element 227 (modulation device) is disposed between the OLED panel 223a and the right optical system 251. The modulation element 227 is formed, for example, of a transmissive liquid crystal panel and modulates the light emitted from the OLED panel 223a to produce image light L. The modulated image light L having passed through the modulation element 227 is guided via the right light guide plate 26 to the right eye RE.

The OLED unit 241a corresponding to the left eye LE includes an OLED panel 243a, which emits white light, and the OLED drive circuit 245, which drives the OLED panel 243a to cause it to emit the light. A modulation element 247 (modulation device) is disposed between the OLED panel 243a and the left optical system 252. The modulation element 247 is formed, for example, of a transmissive liquid crystal panel and modulates the light emitted from the OLED panel 243a to produce image light L. The modulated image light L having passed through the modulation element 247 is guided via the left light guide plate 28 to the left eye LE. The modulation elements 227 and 247 are connected to a liquid crystal driver circuit that is not shown. The liquid crystal driver circuit (modulation device driver) is mounted, for example, on a substrate disposed in the vicinity of the modulation elements 227 and 247.

According to the image display section of the variation, the right display unit 22 and the left display unit 24 are configured as video elements including the OLED panels 223a and 243a, each of which serves as a light source section, and the modulation elements 227 and 247, each of which modulates light emitted from the corresponding light source section and outputs image light containing a plurality of color light fluxes. The modulation devices that modulate the light emitted from the OLED panels 223a and 243a do not necessarily have the configuration in which a transmissive liquid crystal panel is employed. For example, a reflective liquid crystal panel may be used in place of the transmissive liquid crystal panel, or a digital micromirror device may be used. A laser-retina-projection-type HMD 100 may even be provided.

In the embodiment described above, the spectacle-shaped image display section 20 has been described, and the form of the image display section 20 can be arbitrarily changed. For example, the image display section 20 may be so formed as to be mounted as a cap or may be so formed as to be built in a helmet or any other body protection gear. The image display section 20 may still instead be configured as an HUD (head-up display) incorporated in an automobile, an airplane, or any other vehicle, or any other transportation apparatus.

In the embodiment described above, the configuration in which the half-silvered mirrors 261 and 231 form virtual images in part of the right light guide plate 26 and the left light guide plate 28 is presented as an example of an optical system that guides image light to the user's eyes. The configuration can, however, be arbitrarily changed. For example, a virtual image may be formed in a region that occupies the entirety (or majority) of each of the right light guide plate 26 and the left light guide plate 28. In this case, the size of the image may be reduced by the action of changing the position where the image is displayed. Further, the optical elements in the embodiment of the invention are not limited to the right light guide plate 26 and the left light guide plate 28 having the half-silvered mirrors 261 and 282, and an arbitrary form can be employed as long as optical parts that cause the image light to be incident on the user's eyes (diffraction grating, prism, or holographic element, for example) are used.

Variation 4:

In the embodiment described above, the procedure of the display plane setting process is presented by way of example. The procedure of the display plane setting process can, however, be arbitrarily specified to the extent that the specified procedure does not depart from the substance of the invention. For example, addition and omission of a step to be executed, change of the content of the process in a step, and other manipulation of a step in the procedure can be performed.

In the embodiment described above, the position of the center of gravity is used to identify the positions of the reference plane and the virtual object display plane. Arbitrary information can, however, be used as long as the positions of the reference plane and the virtual object display plane can be identified. For example, an end point of each of the reference plane and the virtual object display plane (upper left point, for example) may be used in place of the position of the center of gravity, or the frame of each of the reference plane and the virtual object display plane may be used in place of the position of the center of gravity. Further, for example, both the position of the center of gravity and an end point of each of the reference plane and the virtual object display plane may be used.

In the embodiment described above, the augmented reality processing section 151 uses the default display plane setting 126 (position of center of gravity D and plane inclinations Dx, Dy, and Dz) and the change parameter 128 (amount of change in position of center of gravity and amounts of change in inclinations x, y, and z) to control the position and inclinations of the virtual object display plane after correction to be equal to the position and inclinations of the reference plane. The augmented reality processing section 151 can, however, employ an arbitrary aspect as long as the position and inclinations of the virtual object display plane after correction are changed on the basis of the position C and the inclinations Cx, Cy, and Cz of the reference plane CA. For example, the augmented reality processing section 151 may multiply the change parameter 128 by a certain coefficient.

In the embodiment described above, the camera 61 performs 3D scanning (3D recognition) in the direction of the user's sight line. The camera 61 may, however, perform 3D scanning over the entire range over which the camera 61 can recognize an object. The method for performing the 3D scanning in the embodiment described above is presented only by way of example, and any other method can be employed.

In the embodiment described above, the display plane setting section 152 uses the condition b1 (flatness is within first range) and the condition b2 (area is greater than or equal to second value) to evaluate the reference plane. The display plane setting section 152 may, however, omit either the condition b1 or b2 or both.

As for the condition b2 (area is greater than or equal to second value) in the embodiment described above, the display plane setting section 152 may be allowed to use a plurality of modes (normal mode and minute plane detection mode, for example). A mode to be employed is specified, for example, in accordance with the user's instruction. In the minute plane detection mode, the display plane setting section 152 sets the second value in the condition b2 to be smaller than the second value in the normal mode. The display plane setting section 152 can thus carry out the display plane setting process by using a small plane as the reference plane in accordance with the user's instruction.

In place of the condition b2 (area is greater than or equal to second value) in the embodiment described above, the display plane setting section 152 may use a condition that the distance between the plane of an object under evaluation and the user falls within a predetermined range. The predetermined range can be arbitrarily determined and can, for example, be set at a value ranging from about 20 to 80 cm. Also in this configuration, the display plane setting section 152 can suppress wrong recognition, as in the embodiment described above.

In the embodiment described above, the user's own hand is recognized by referring to the user's fingerprint or palm print, and the evaluation in step S108 is allowed to be performed only in the case where the object under evaluation is the user's own hand. As the method for recognizing the user's own hand, image recognition may be performed on an image captured with a wide-angle camera in place of the finger print or palm print. In this case, the HMD 100 is configured to include the wide-angle camera in place of the camera 61 or in addition to the camera 61. The display plane setting section 152 performs image recognition on an image captured with the wide-angle camera and can determine that the object under evaluation (hand) is the user's hand in a case where the display plane setting section 152 determines that the object under evaluation (hand) extends from the user of the HMD 100.

In the embodiment described above, the display plane setting section 152 evaluates whether or not an object under evaluation is a human hand by image analysis of an image captured with the camera 61. The display plane setting section 152 may, however, evaluate whether or not an object under evaluation is a human hand on the basis of a result of detection performed by a temperature detection section (thermography) incorporated in the HMD 100.

In the embodiment described above, the display plane setting section 152 can set a plurality of virtual object display planes via the display plane setting process. To set a plurality of virtual object display planes, the display plane setting section 152 may, for example, set a first display plane with respect to the user's right hand as the reference plane and a second display plane with respect to the user's left hand as the reference plane. The plurality of virtual object display planes may be sequentially set by serially carrying out the display plane setting process or may be simultaneously set by carrying out the display plane setting processes in parallel.

In the embodiment described above, in the case where a value other than the initial value is stored in the change parameter 128, the augmented reality processing section 151 immediately displays a virtual object in a display plane corrected by using the change parameter 128. The augmented reality processing section 151 may instead carry out the process described above after the value other than the initial value is stored in the change parameter 128 and then a predetermined period elapses. The augmented reality processing section 151 can thus delay the timing when a virtual object is displayed in the corrected display plane after the value other than the initial value is stored in the change parameter 128 (step S112 in FIG. 8). The delay period may be set as appropriate by a request from the user or an application program installed in the HMD 100.

In the display plane setting process in the embodiment described above, the description has been made of a 2D virtual object display plane. The display plane setting section 152 may instead be capable of setting a 3D virtual object display plane. The 3D virtual object display plane can be identified, for example, by the position of the center of gravity A of a 3D virtual object, orientations of a reference point Ax, Ay, and Az in the 3D virtual object, and the size of the 3D virtual object As. In the display plane setting process described above, the display plane setting section 152 can identify the position of the center of gravity, orientations, and size of the 3D virtual object by using a person's palm as a first reference plane and finger ball surfaces of the fingers extending from the palm as a second reference plane (finger ball of thumb) to a sixth reference plane (finger ball of little finger). The display plane setting section 152 can thus adjust not only a 2D virtual object display plane but also a 3D virtual object display plane as intended by the user.

Variation 5:

The invention is not limited to the embodiment, examples, and variations described above and can be implemented in a variety of other configurations to the extent that the other configurations do not depart from the substance of the invention. For example, to solve part or entirety of the problems described above or to achieve part or entirety of the advantageous effects described above, the technical features in the embodiment, examples, and variations corresponding to the technical features in the forms described in the SUMMARY section can be swapped or combined with each other as appropriate. Further, if the technical features are not described as essential features in the present specification, they can be deleted as appropriate.

The entire disclosure of Japanese Patent Application Nos. 2016-068694, filed Mar. 30, 2016 and 2016-226406, filed Nov. 22, 2016 are expressly incorporated by reference herein.

What is claimed is:

1. A head mounted display device comprising:
   a display that allows a user on whom the head mounted display device is mounted to visually recognize both a virtual image and external scenery in a real space;
   a laser beam output section that outputs a laser beam;
   an imaging element that receives the laser beam reflected off the external scenery; and
   a processor programmed to:
      acquire information by the imaging element on the real space;
      acquire a direction of a sight line of the user;
      recognize, based on analyzing the acquired information on the real space, a reference plane that is a flat plane that is present in the real space;
      determine if the recognized reference plane satisfies a predetermined condition;
      determine a position and an inclination of the reference plane in a visual field of the user, omitting from this determination of the position and the inclination acquisition of information from the imaging element on the real space that does not correspond to the acquired direction of the sight line;
      when the recognized reference plane satisfies the predetermined condition, store a change parameter that corresponds to displaying on the recognized reference plane;
      cause the display to change a virtual object in the displayed virtual image based on the stored change parameter; and
      detect, based on the information on the real space acquired by the imaging element, a display distance from an eye of the user to the reference plane and change positions of pixels of the virtual object in accordance with the detected display distance.

2. The head mounted display according to claim 1, wherein the processor is further programmed to change the positions of the pixels of the virtual object and an inclination of the virtual object based on the determined position and inclination of the reference plane.

3. The head mounted display according to claim 2, wherein the processor is further programmed to change the positions of the pixels and the inclination of the virtual object visually recognized by the user to be equal to the position and the inclination of the reference plane.

4. The head mounted display according to claim 2, wherein the processor is further programmed to (i) determine the position and inclination of the reference plane in the user's visual field again when a predetermined first action performed by the user is detected and (ii) change the changed positions of the pixels of the virtual object and the changed inclination of the virtual object again based on the newly determined position and inclination of the reference plane.

5. The head mounted display according to claim 1, wherein the processor is further configured to change a display aspect of the virtual object when a predetermined second action performed by the user is detected.

6. The head mounted display according to claim 5, wherein the predetermined second action contains at least one of a movement of a hand of the user in the real space and a change in a shape of the hand.

7. The head mounted display according to claim 1, wherein the processor is further programmed to take at least one of the hand of the user, an object having a predetermined shape, and an image containing information having a predetermined pattern as an object having the reference plane.

8. The head mounted display according to claim 1, wherein the reference plane that satisfies the predetermined condition is a plane having flatness within a predetermined first range and having an area greater than or equal to a predetermined second value as a result of 3D recognition.

9. The head mounted display according to claim 1, wherein:
   the display includes a right image display that has a plurality of pixels for a right eye of the user and that allows the right eye to visually recognize the virtual image, and a left image display that has a plurality of pixels for a left eye of the user and that allows the left eye to visually recognize the virtual image, and
   the pixels of the virtual object comprise the plurality of pixels for the right eye and the plurality of pixels for the left eye.

10. The head mounted display according to claim 9, wherein the processor is further programmed to change the positions of the pixels of the virtual object in such a way that a display convergence angle, which is an angle formed by the right eye and the left eye viewed from the virtual object, decreases as a reference convergence angle, which is an angle formed by the right eye and the left eye viewed from the reference plane, decreases.

11. The head mounted display according to claim 10, wherein the processor is further programmed to change the positions of the pixels of the virtual object in such a way that the reference convergence angle is equal to the display convergence angle.

12. The head mounted display according to claim 1, further comprising a memory that stores an initial setting of the display distance.

13. The head mounted display according to claim 1, further comprising a distance measuring sensor that detects the display distance.

14. The head mounted display device according to claim 1, wherein if no object is present in the acquired direction of the sight line, the processor is further configured to send a message prompting the user to move the direction of the sight line.

15. A method for controlling a head mounted display device, the method comprising:
- causing, by a processor, a display to form a virtual image containing a virtual object that is an object that does not exist in a real space so as to allow a user to visually recognize the virtual image, the display allowing the user to also recognize external scenery in the real space;
- outputting, by a laser beam output section, a laser beam;
- receiving, by an imaging element, the laser beam reflected off the external scenery;
- acquiring, by the processor and the imaging element, information on the real space;
- acquiring, by the processor, a direction of a sight line of the user;
- recognizing, by the processor, based on analyzing the acquired information on the real space, a reference plane that is a flat plane that is present in the real space;
- determining, by the processor, if the recognized reference plane satisfies a predetermined condition;
- determining, by the processor, a position and an inclination of the reference plane in a visual field of the user, omitting from this determination of the position and the inclination acquisition of information from the imaging element on the real space that does not correspond to the acquired direction of the sight line;
- when the recognized reference plane satisfies the predetermined condition, storing, by the processor, a change parameter that corresponds to displaying on the recognized reference plane;
- causing, by the processor, the display to change a virtual object in the displayed virtual image based on the stored change parameter; and
- detecting, by the processor and based on the information on the real space acquired by the imaging element, a display distance from an eye of the user to the reference plane and changing, by the processor, positions of pixels of the virtual object in accordance with the detected display distance.

16. A non-transitory computer readable medium with computer program instructions stored thereon, that when executed by a processor, perform steps comprising:
- operating a display to form a virtual image containing a virtual object that is an object that does not exist in a real space so as to allow a user to visually recognize the virtual image, the display allowing the user to also recognize external scenery in the real space;
- outputting, by a laser beam output section, a laser beam;
- receiving, by an imaging element, the laser beam reflected off the external scenery;
- acquiring, by the imaging element, information on the real space;
- acquiring a direction of a sight line of the user;
- recognizing, based on analyzing the acquired information on the real space, a reference plane that is a flat plane that is present in the real space;
- determining if the recognized reference plane satisfies a predetermined condition;
- determining a position and an inclination of the reference plane in a visual field of the user, omitting from this determination of the position and the inclination acquisition of information from the imaging element on the real space that does not correspond to the acquired direction of the sight line;
- when the recognized reference plane satisfies the predetermined condition, storing a change parameter that corresponds to displaying on the recognized reference plane;
- operating the display to change a virtual object in the displayed virtual image based on the stored change parameter; and
- detecting, based on the information on the real space acquired by the imaging element, a display distance from an eye of the user to the reference plane and changing positions of pixels of the virtual object in accordance with the detected display distance.

* * * * *